(12) United States Patent
Nakazawa et al.

(10) Patent No.: US 11,170,243 B2
(45) Date of Patent: Nov. 9, 2021

(54) IMAGE PROCESSING DEVICE, IMAGE FORMING APPARATUS, AND IMAGE PROCESSING METHOD

(71) Applicants: Masamoto Nakazawa, Kanagawa (JP); Tadaaki Oyama, Kanagawa (JP); Yutaka Ohmiya, Tokyo (JP)

(72) Inventors: Masamoto Nakazawa, Kanagawa (JP); Tadaaki Oyama, Kanagawa (JP); Yutaka Ohmiya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/886,810

(22) Filed: May 29, 2020

(65) Prior Publication Data
US 2020/0410271 A1  Dec. 31, 2020

(30) Foreign Application Priority Data

Jun. 25, 2019 (JP) .............................. JP2019-117931

(51) Int. Cl.
*G06K 9/20* (2006.01)
*H04N 1/00* (2006.01)
(Continued)

(52) U.S. Cl.
CPC ....... *G06K 9/2036* (2013.01); *G06K 9/00456* (2013.01); *G06K 9/00469* (2013.01);
(Continued)

(58) Field of Classification Search
CPC .......... G06K 15/027–14; G06K 15/1867–225; G06K 2215/0094; G06K 2215/101–111;
(Continued)

(56) References Cited

U.S. PATENT DOCUMENTS 5,481,334 A * 1/1996 Arimoto .............. G03G 21/046
250/556
5,631,723 A * 5/1997 Arimoto .............. G03G 21/046
358/501
(Continued)

FOREIGN PATENT DOCUMENTS

| JP | 2007-281539 | 10/2007 |
|---|---|---|
| JP | 2012-029147 | 2/2012 |
| JP | 2013-084071 | 5/2013 |

OTHER PUBLICATIONS

Extended European Search Report dated Nov. 6, 2020 in European Patent Application No. 20180479.6, 13 pages.
(Continued)

*Primary Examiner* — Negussie Worku
(74) *Attorney, Agent, or Firm* — Xsensus LLP

(57) ABSTRACT

An image processing device includes a light source, an image reader, and circuitry. The light source is configured to irradiate an object at least with invisible light. The image reader is configured to read first information and second information. The first information is included in the object and indicating a first characteristic in response to the object being irradiated with the invisible light. The second information is included in the object and indicating a second characteristic in response to the object being irradiated with the invisible light. The circuitry is configured to selectively output the first information read by the image reader.

20 Claims, 27 Drawing Sheets

(51) Int. Cl.
*G06K 9/00* (2006.01)
*H04N 1/028* (2006.01)

(52) U.S. Cl.
CPC ......... *G06K 9/2063* (2013.01); *H04N 1/0087* (2013.01); *H04N 1/02815* (2013.01)

(58) Field of Classification Search
CPC ............. G06K 9/2036; G06K 9/00456; G06K 9/00469; G06K 9/2063; G06K 15/00–4095; G06K 2215/00–111; H04N 1/00–648; H04N 1/032–036; H04N 1/27–31; H04N 1/32144–32352; H04N 1/38–419; H04N 1/46–648; H04N 2201/00–33392; H04N 2201/3269–3271; H04N 2201/33378; H04N 1/0087; H04N 1/02815; H04N 1/4097; H04N 1/40093; H04N 1/00127; H04N 1/00798; H04N 2201/0094; G06F 2206/15–1514; Y02D 10/159
USPC .......................................... 358/475, 509, 505
See application file for complete search history.

(56) References Cited

U.S. PATENT DOCUMENTS

| | | | |
|---|---|---|---|
| 6,051,826 A * | 4/2000 | Arimoto | G07D 7/12 250/208.1 |
| 6,078,051 A | 6/2000 | Banton et al. | |
| 6,393,160 B1 | 5/2002 | Edgar | |
| 7,724,402 B2 * | 5/2010 | Ichikawa | H04N 1/02845 358/474 |
| 8,059,315 B2 * | 11/2011 | Endo | H04N 1/02865 358/474 |
| 10,834,272 B2 * | 11/2020 | Nakazawa | H04N 1/40056 |
| 2008/0252787 A1 | 10/2008 | Nakazawa et al. | |
| 2009/0310193 A1 * | 12/2009 | Endo | H04N 1/02815 358/474 |
| 2011/0196240 A1 * | 8/2011 | Mitani | G06K 9/00033 600/476 |
| 2014/0211273 A1 | 7/2014 | Konno et al. | |
| 2015/0098117 A1 | 4/2015 | Marumoto et al. | |
| 2015/0163378 A1 | 6/2015 | Konno et al. | |
| 2016/0003673 A1 | 1/2016 | Hashimoto et al. | |
| 2016/0155000 A1 * | 6/2016 | Du | G06K 9/00604 382/135 |
| 2017/0200035 A1 * | 7/2017 | Teraura | G06K 19/06037 |
| 2017/0295298 A1 | 10/2017 | Ozaki et al. | |
| 2018/0069996 A1 | 3/2018 | Shukla et al. | |
| 2019/0104236 A1 * | 4/2019 | Iwafuchi | H01L 27/14621 |
| 2019/0244992 A1 * | 8/2019 | Yokogawa | H01L 27/14605 |
| 2019/0327387 A1 | 10/2019 | Hashimoto et al. | |
| 2019/0335061 A1 | 10/2019 | Nakazawa et al. | |
| 2020/0053229 A1 | 2/2020 | Hashimoto et al. | |
| 2020/0053230 A1 | 2/2020 | Nakazawa et al. | |
| 2020/0053233 A1 | 2/2020 | Nakazawa et al. | |
| 2020/0288076 A1 * | 9/2020 | Kozuka | H04N 5/378 |
| 2020/0412904 A1 * | 12/2020 | Ohmiya | H04N 1/1013 |

OTHER PUBLICATIONS

Dey Soumyadeep, et al., "Colored Rubber Stamp Removal from Document Images", Indian Institute of Technology, Kharagpur, XP047470916, Dec. 10, 2013, 6 pages.

* cited by examiner

FIG. 7B   ABC株式会社
　　　　　 TEL 00-111-2222

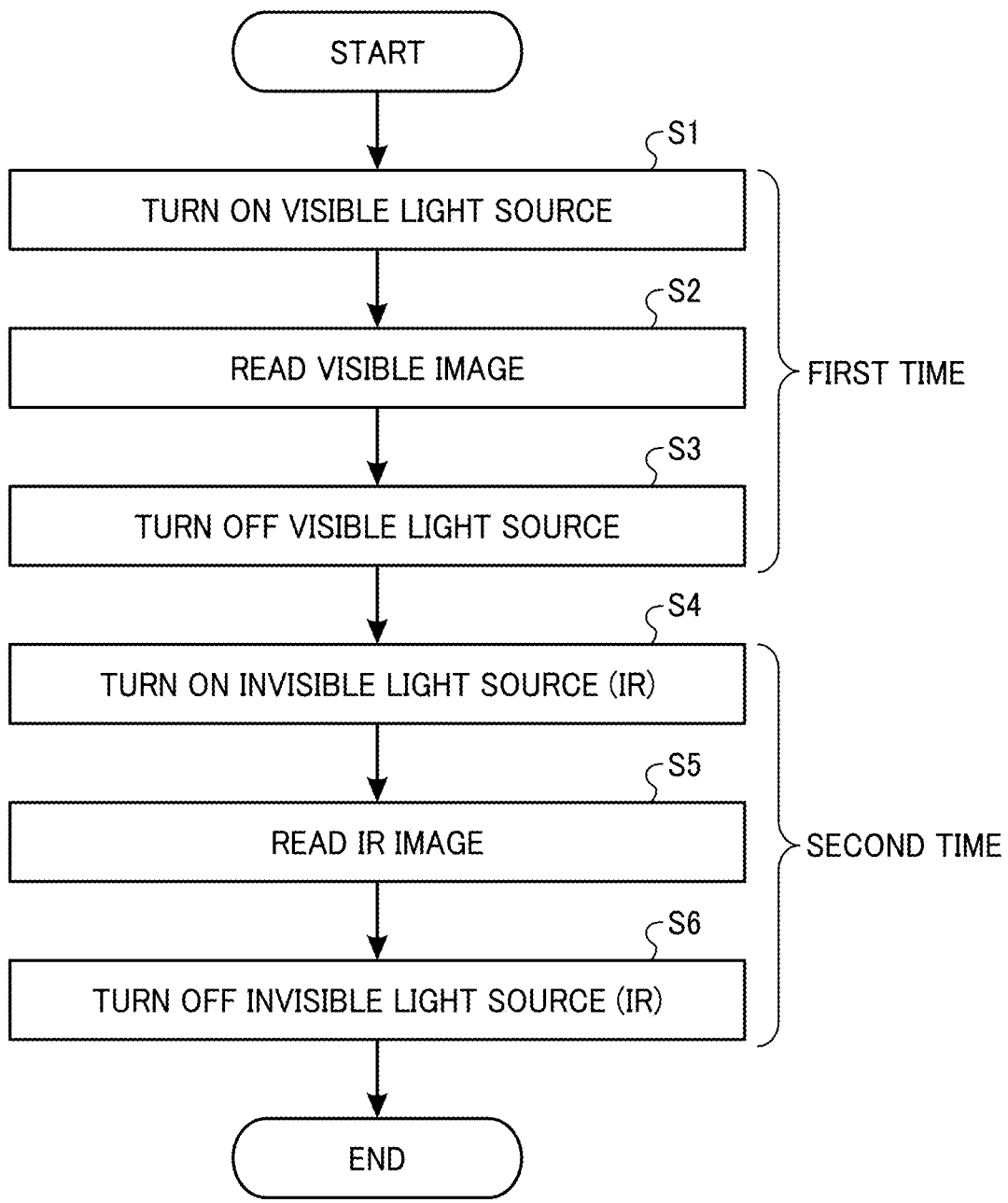

FIG. 14B
¥100,000
¥10,000

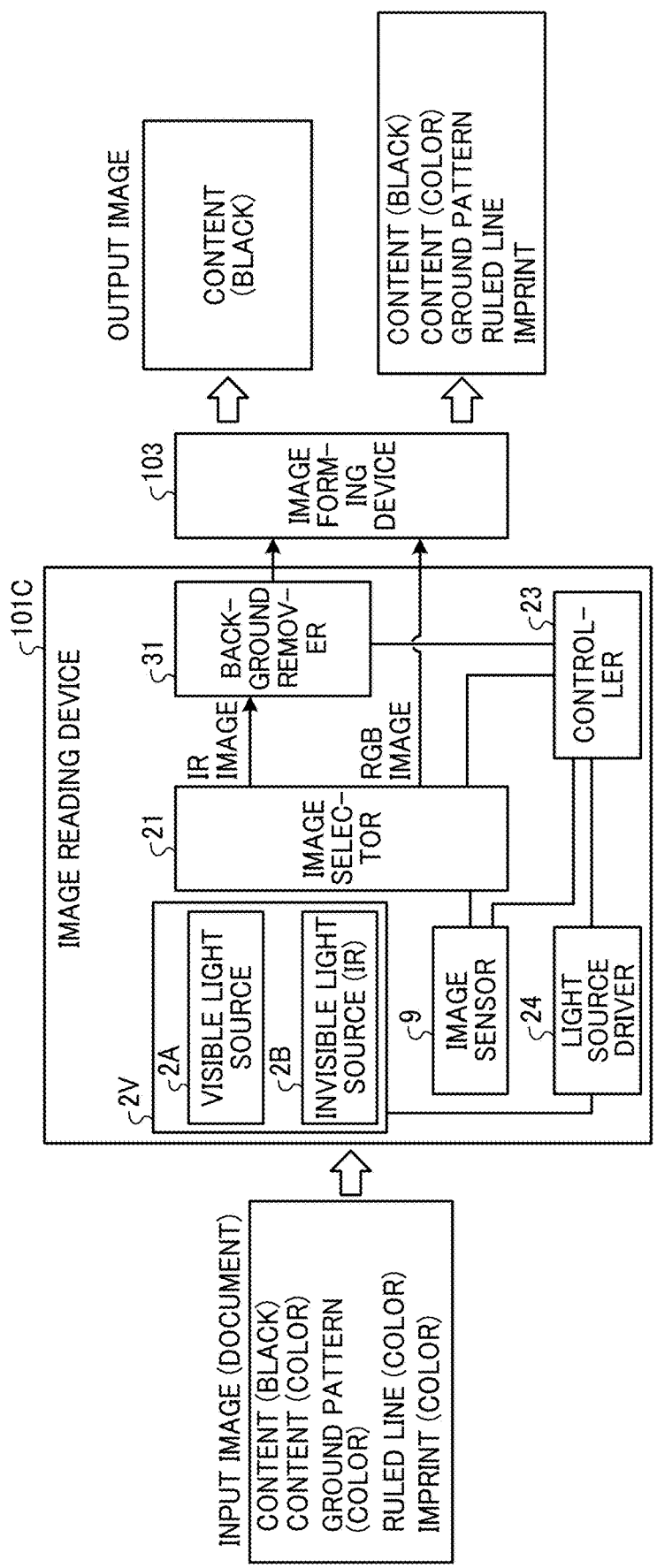

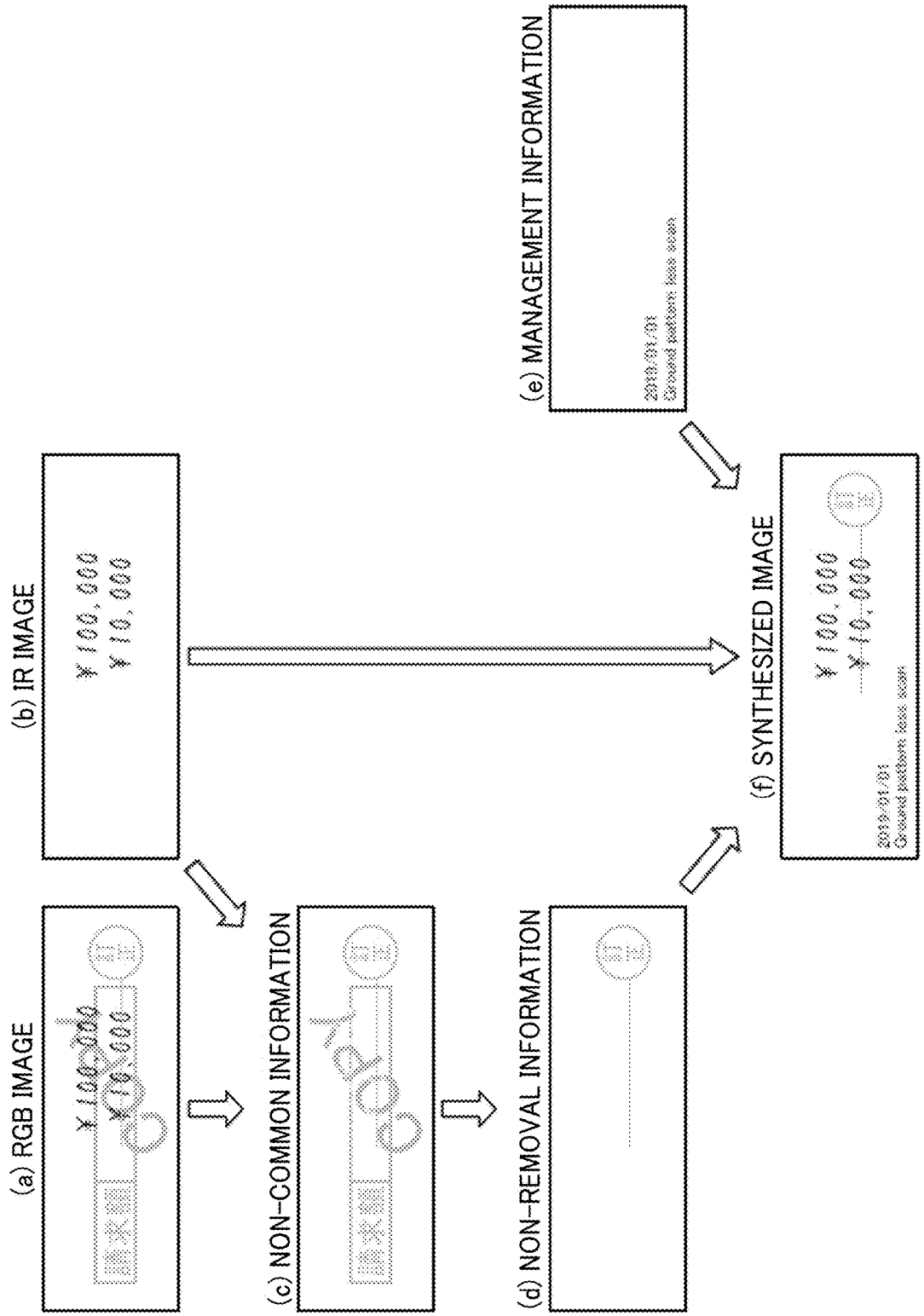

IMAGE PROCESSING DEVICE, IMAGE FORMING APPARATUS, AND IMAGE PROCESSING METHOD

CROSS-REFERENCE TO RELATED APPLICATION

This patent application is based on and claims priority pursuant to 35 U.S.C. § 119(a) to Japanese Patent Application No. 2019-117931, filed on Jun. 25, 2019, in the Japan Patent Office, the entire disclosure of which is hereby incorporated by reference herein.

BACKGROUND

Technical Field

Embodiments of the present disclosure relate to an image processing device, an image forming apparatus incorporating the image processing device, and an image processing method.

Related Art

In recent years, the document security consciousness has been increased. For example, a document with a ground pattern as a latent image is used as a security document that prevents duplication of the document or provides a psychological deterrent to duplication of the document.

SUMMARY

In one embodiment of the present disclosure, a novel image processing device includes a light source, an image reader, and circuitry. The light source is configured to irradiate an object at least with invisible light. The image reader is configured to read first information and second information. The first information is included in the object and indicating a first characteristic in response to the object being irradiated with the invisible light. The second information is included in the object and indicating a second characteristic in response to the object being irradiated with the invisible light. The circuitry is configured to selectively output the first information read by the image reader.

Also described are novel image forming apparatus incorporating the image processing device and image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7B is a diagram illustrating an invisible image as a result of invisible reading of the image of FIG. 7A;

FIG. 8A is a diagram illustrating an image of text and a ruled line;

FIG. 8B is a diagram illustrating an invisible image as a result of invisible reading of the image of FIG. 8A;

FIG. 11A is a diagram illustrating an image of text and a ground pattern;

FIG. 11B is a diagram illustrating an invisible image as a result of invisible reading of the image of FIG. 11;

FIG. 11C is a diagram illustrating a result of a background removal;

FIG. 13 is a schematic flowchart of an image reading process performed by the image reading device of FIG. 12;

FIG. 14B is a diagram illustrating an invisible image as a result of invisible reading of the image of FIG. 14A;

FIG. 15 is a block diagram illustrating electric connections of components of an image reading device according to a fourth embodiment of the present disclosure;

FIG. 29A is a diagram illustrating an image on a slip;

FIG. 29B is a diagram illustrating a result of reading of the image of FIG. 29A;

FIG. 34 is a diagram illustrating a process of generating a synthesized image by adding management information to content information to be output.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
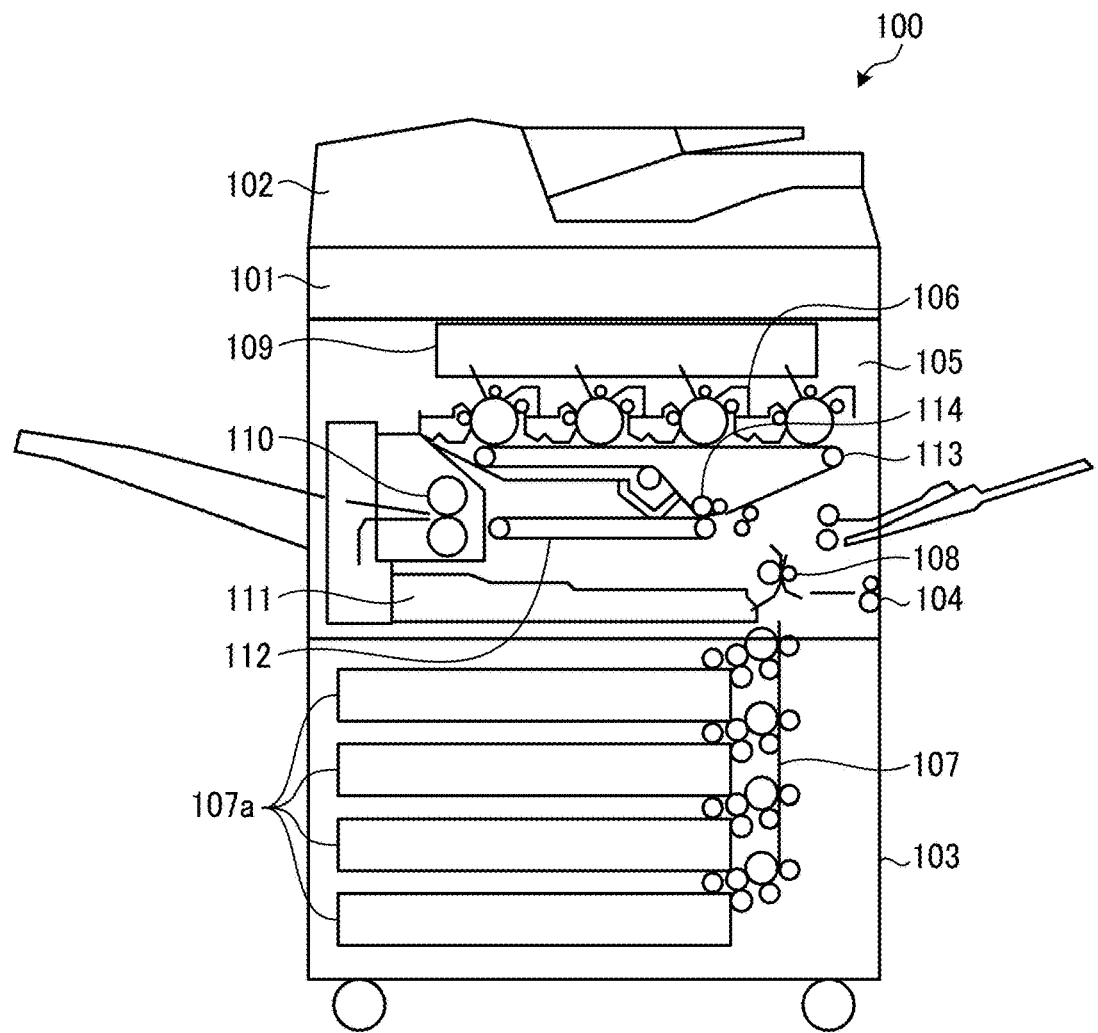
FIG. 1 is a schematic view of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIGS. 1 to 9C, a description is given of a first embodiment of the present disclosure.

FIG. 1 is a schematic view of an image forming apparatus 100 according to the first embodiment of the present disclosure.

In FIG. 1, the image forming apparatus 100 is generally called a multifunction peripheral, printer, or product (MFP) having at least two of copying, printing, scanning, and facsimile functions.

The image forming apparatus 100 includes an image reading device 101 serving as an image processing device, an automatic document feeder (ADF) 102 atop the image reading device 101, and an image forming device 103 below the image reading device 101. In order to describe an internal configuration of the image forming device 103, FIG. 1 illustrates the internal configuration of the image forming device 103 from which an external cover is removed.

The ADF 102 is a document supporter that positions, at a reading position, a document or an original including an image to be read. The ADF 102 automatically feeds the document placed on a table to the reading position. The image reading device 101 reads the document fed by the ADF 102 at the predetermined reading position. The image reading device 101 includes a platen (i.e., exposure glass) as an upper surface of the image reading device 101. The platen serves as a document supporter on which a document is placed. The image reading device 101 reads the document on the platen, that is, at the reading position. Specifically, the image reading device 101 is a scanner that includes a light source, an optical system, and an image sensor such as a charge-coupled device (CCD) inside. In the image reading device 101, the light source irradiates the document. Reflected light from the document passes through the optical system and strikes the image sensor, which reads the reflected light. Thus, the image reading device 101 reads an image of the document.

The image forming device 103 prints the image of the document read by the image reading device 101. In other words, the image forming device 103 forms an image in accordance with information from the image reading device 101. The image forming device 103 includes a manual feed roller pair 104 through which a recording medium is manually inserted and a recording medium supplier 107 that supplies a recording medium. The recording medium supplier 107 includes an assembly that sends out recording media one by one from vertically-aligned input trays 107a. The recording medium thus supplied is sent to a secondary transfer belt 112 via a registration roller pair 108.

A secondary transfer device 114 transfers a toner image from an intermediate transfer belt 113 onto the recording medium conveyed on the secondary transfer belt 112.

The image forming device 103 also includes an optical writing device 109, an image forming unit 105 employing a tandem system, the intermediate transfer belt 113, and the secondary transfer belt 112. Specifically, in an image forming process, the image forming unit 105 render a latent image written by the optical writing device 109 visible as a toner image and forms the toner image on the intermediate transfer belt 113.

More specifically, the image forming unit 105 includes four rotatable, drum-shaped photoconductors to form yellow, magenta, cyan, and black toner images on the four photoconductors, respectively. Each of the four photoconductors is surrounded by various pieces of image forming equipment 106 including a charging roller, a developing device, a primary transfer roller, a cleaner, and a neutralizer. The pieces of image forming equipment 106 function around each of the four photoconductors to form a toner image on the corresponding photoconductor and transfer the toner image onto the intermediate transfer belt 113. Specifically, the primary transfer rollers transfer the toner images from the respective photoconductors onto the intermediate transfer belt 113. As a consequence, a composite toner image is formed on the intermediate transfer belt 113.

The intermediate transfer belt 113 is entrained around a drive roller and a driven roller and disposed so as to pass through primary transfer nips between the four photoconductors and the respective primary transfer rollers. As the intermediate transfer belt 113 rotates, the composite toner image constructed of the toner images primary-transferred onto the intermediate transfer belt 113 is conveyed to the secondary transfer device 114. The secondary transfer device 114 secondarily transfers the composite toner image onto the recording medium on the secondary transfer belt 112. As the secondary transfer belt 112 rotates, the recording medium is conveyed to a fixing device 110. The fixing device 110 fixes the composite toner image onto the recording medium as a color image. Finally, the recording medium is discharged onto an output tray disposed outside a housing of the image forming apparatus 100. Note that, in a case of duplex printing, a reverse assembly 111 reverses the front and back sides of the recording medium and sends out the reversed recording medium onto the secondary transfer belt 112.

Note that the image forming device 103 is not limited to an electrophotographic image forming device that forms an image on a recording medium by electrophotography as described above. Alternatively, the image forming device 103 may be an inkjet image forming apparatus that forms an image on a recording medium in an inkjet printing system.

Figure 2:
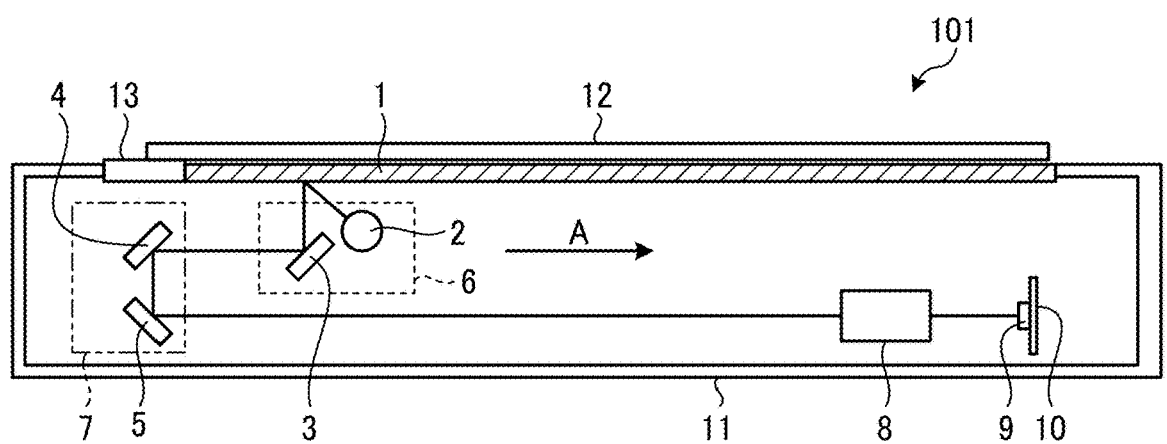
FIG. 2 is a cross-sectional view of an image reading device included in the image forming apparatus.
Figure 3:
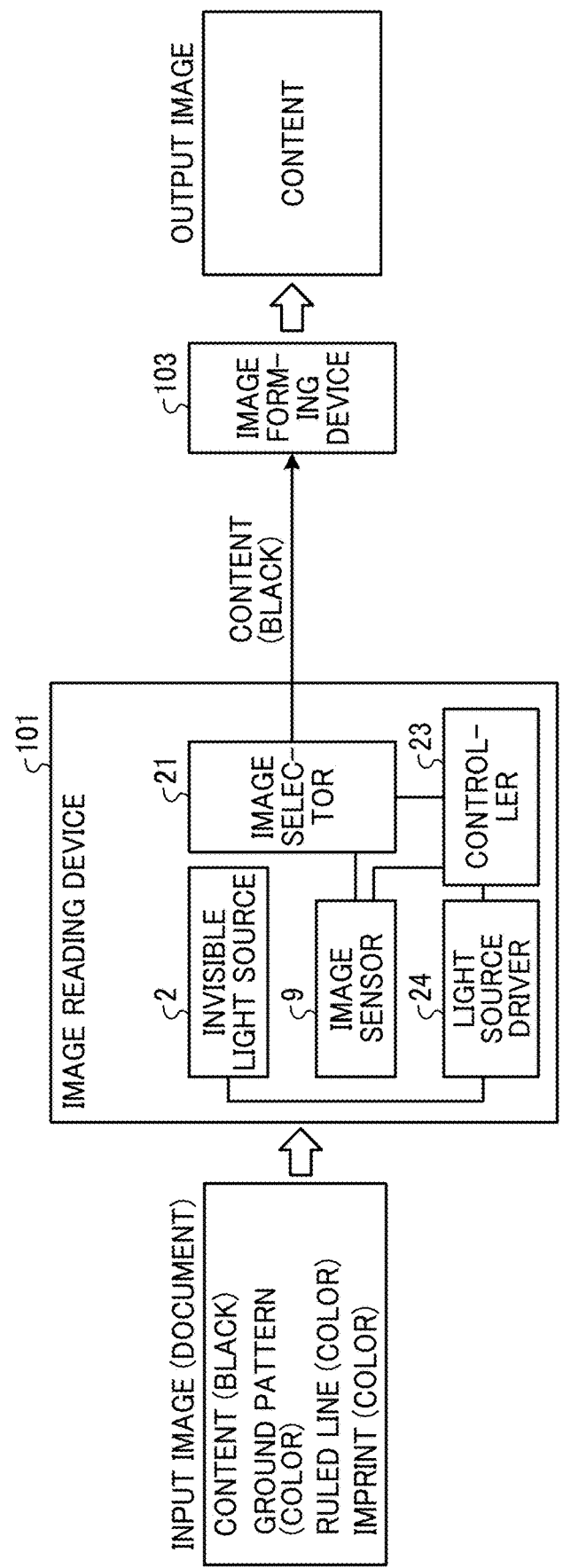
FIG. 3 is a block diagram illustrating electric connections of components of the image reading device according to a first embodiment of the present disclosure.

Referring now to FIGS. 2 and 3, a detailed description is given of the image reading device 101 described above.

FIG. 2 is a cross-sectional view of the image reading device 101 included in the image forming apparatus 100 described above.

As illustrated in FIG. 2, the image reading device 101 includes, in a housing 11, a sensor substrate 10 provided with an image sensor 9, a lens unit 8, a first carriage 6, and a second carriage 7. The image sensor 9 serving as an image reader is, e.g., a CCD or complementary metal oxide semiconductor (CMOS) image sensor. The first carriage 6 includes a light source 2 as a light emitting diode (LED) and a mirror 3. The second carriage 7 includes mirrors 4 and 5. The image reading device 101 further includes a platen 1 and a reference white plate 13 as an upper surface of the image reading device 101.

In a reading operation, the image reading device 101 emits light upward from the light source 2 while moving the first carriage 6 and the second carriage 7 from home positions, respectively, in a sub-scanning direction A. The first carriage 6 and the second carriage 7 causes reflected light from a document 12 to be imaged on the image sensor 9 via the lens unit 8.

When the power is turned on, the image reading device 101 reads reflected light from the reference white plate 13 and sets a reference. Specifically, the image reading device 101 moves the first carriage 6 directly below the reference white plate 13, turns on the light source 2, and causes the reflected light from the reference white plate 13 to be imaged on the image sensor 9, thereby performing a gain adjustment.

FIG. 3 is a block diagram illustrating electric connections of components of the image reading device 101 according to the first embodiment of the present disclosure.

In addition to the image sensor 9 and the light source 2 described above, the image reading device 101 includes an image selector 21 serving as an image selecting unit, a controller 23 serving as a control unit, and a light source driver 24 as illustrated in FIG. 3. Note that the image selector 21 may be implemented as at least one of hardware and software.

Typically, original information and other information are identified simply by color, that is, in a visible range. By contrast, in the present embodiment, colorants with which different pieces of information are written or depicted in a document are identified and read by use of a difference of the colorants in optical characteristic in an invisible range, thereby extracting the original information alone. Thus, the present embodiment enhances the readability.

As illustrated in FIG. 3, the image reading device 101 reads an input image (i.e., document). The input image herein includes content information and ground pattern, ruled line, or imprint information. The content information is information originally desired to be read, such as marks and text information including characters, numbers, and symbols written in black. The ground pattern, ruled line, or imprint information is secondary information depicted in color and not originally desired to be read. Note that the meanings of "black" and "color" herein do not simply indicate colors (i.e., hues). The content information is depicted with a black (K) colorant; whereas ground patterns, ruled lines, and imprints are depicted with color colorants such as cyan (C), magenta (M), and yellow (Y) colorants.

The image reading device 101 reads such pieces of information and selectively outputs the content information alone. The output content information is transferred to the image forming device 103 that performs subsequent processing. The image forming device 103 performs image forming processing and outputs the content information as an output image.

The light source 2 is a near-infrared (NIR) invisible light source that is used to obtain an image in an invisible wavelength range. The light source driver 24 drives the light source 2.

The image sensor 9 images visible and invisible wavelength ranges. The image sensor 9 reads reflected light from an object. In a case in which the image sensor 9 reads a visible image, the image sensor 9 outputs red, green, and blue (RGB) signals. In a case in which the image sensor 9 reads an invisible image, the image sensor 9 outputs an NIR signal. Since a color filter of a general image sensor has a characteristic of transmitting NIR light, an NIR signal appears at each output of RGB upon reading of an invisible image. In the present embodiment, an NIR signal of an R output is described as a representative of RGB outputs. Note that, in the present embodiment, a visible image refers to an image captured by the image sensor 9 as a result of emission of visible light. By contrast, an invisible image refers to an image captured by the image sensor 9 as a result of emission of invisible light such as the NIR light.

As described above, the image reading device 101 serving as an image processing device includes the light source 2, the image sensor 9 serving as an image reader, and the image selector 21 serving as an image selecting unit. The light source 2 irradiates an object at least with invisible light. The image sensor 9 reads first information and second information. The first information is included in the object and indicates a first characteristic in response to the object being irradiated with the invisible light. Examples of the first information include text information and code information. The second information is included in the object and indicates a second characteristic in response to the object being irradiated with the invisible light. Examples of the second information include a ground pattern, a ruled line, and an imprint. The image selector 21 serving as an image selecting unit selectively outputs the first information read by the image sensor 9.

Figure 4:
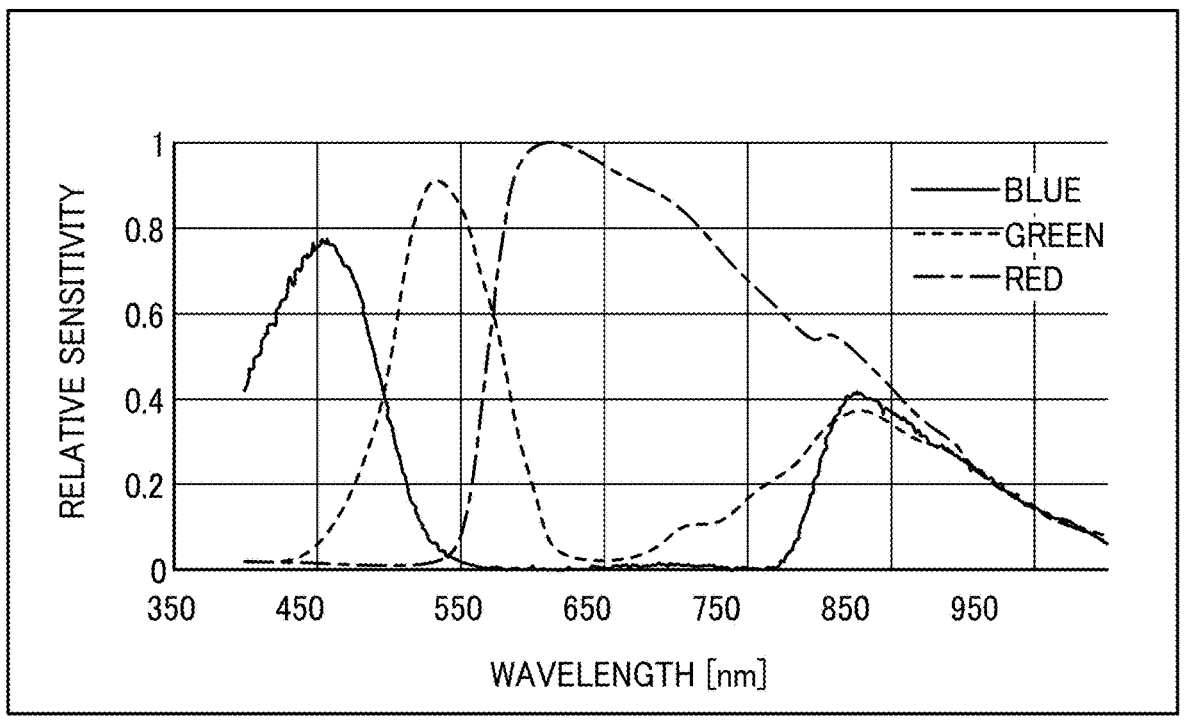
FIG. 4 is a graph illustrating a spectral sensitivity characteristic of an image sensor.

Referring now to FIG. 4, a description is given of a spectral sensitivity characteristic of the image sensor 9.

FIG. 4 is a graph illustrating a spectral sensitivity characteristic of an image sensor.

In the present embodiment, an invisible wavelength range refers to a near-infrared range of from 780 nm to 1000 nm.

In other words, the light source 2 emits infrared (IR) light having a wavelength of from 780 nm to 1000 nm as the invisible light.

By use of the near-infrared range of from 780 nm to 1000 nm, the invisible reading of the present embodiment is implemented at a relatively low cost. FIG. 4 illustrates a spectral sensitivity characteristic of a silicon image sensor that is used in a general scanner. As illustrated in FIG. 4, the silicon image sensor has a relatively high sensitivity in the wavelength of from 780 nm to 1000 nm. This is because silicon has a quantum sensitivity in the near-infrared range while a general pigment-based color filter has a high transmittance in the near-infrared range.

In addition, as described later, general ink or toner has a difference in characteristic in the near-infrared range between CMY and K. Therefore, in consideration of the difference in characteristic together with the spectral sensitivity characteristic of the above-mentioned silicon image sensor, the image reading device 101 identifies the colorants with a relatively high sensitivity by use of a near-infrared range, particularly, the wavelength range of from 780 nm to 1000 nm.

Note that, in the present embodiment, the invisible wavelength range refers to a near-infrared range of from 780 nm to 1000 nm as described above. However, the invisible wavelength range may include another wavelength range. Since the image sensor 9 is made of a silicon semiconductor and has a sensitivity in the near-infrared range, the near-infrared range assigned as an invisible wavelength range allows a general image sensor to be used as the image sensor 9 to facilitate invisible reading. Therefore, the near-infrared range is desirably assigned as an invisible wavelength range.

The image sensor 9 reads input information (i.e., document) with invisible light. The image sensor 9 obtains an image unique to a colorant according to the characteristic in the invisible wavelength range different from the characteristic in the visible wavelength range, thereby selectively outputting colorant information.

As described later, in a case in which toner or ink is used as a colorant, a black (K) colorant and color colorants (e.g., CMY colorants) exhibit respective optical characteristics peculiar to the invisible wavelength range. For example, the black colorant and the color colorants exhibit similar reflection characteristics in the visible wavelength range. However, in the invisible wavelength range, the black (K) colorant exhibits a relatively high absorptance; whereas the color colorants (e.g., CMY colorants) exhibit a relatively high transmittance. Thus, in the invisible wavelength range, the black colorant and the color colorants exhibit optical characteristics different from the optical characteristics exhibited in the visible wavelength range.

Figure 5:
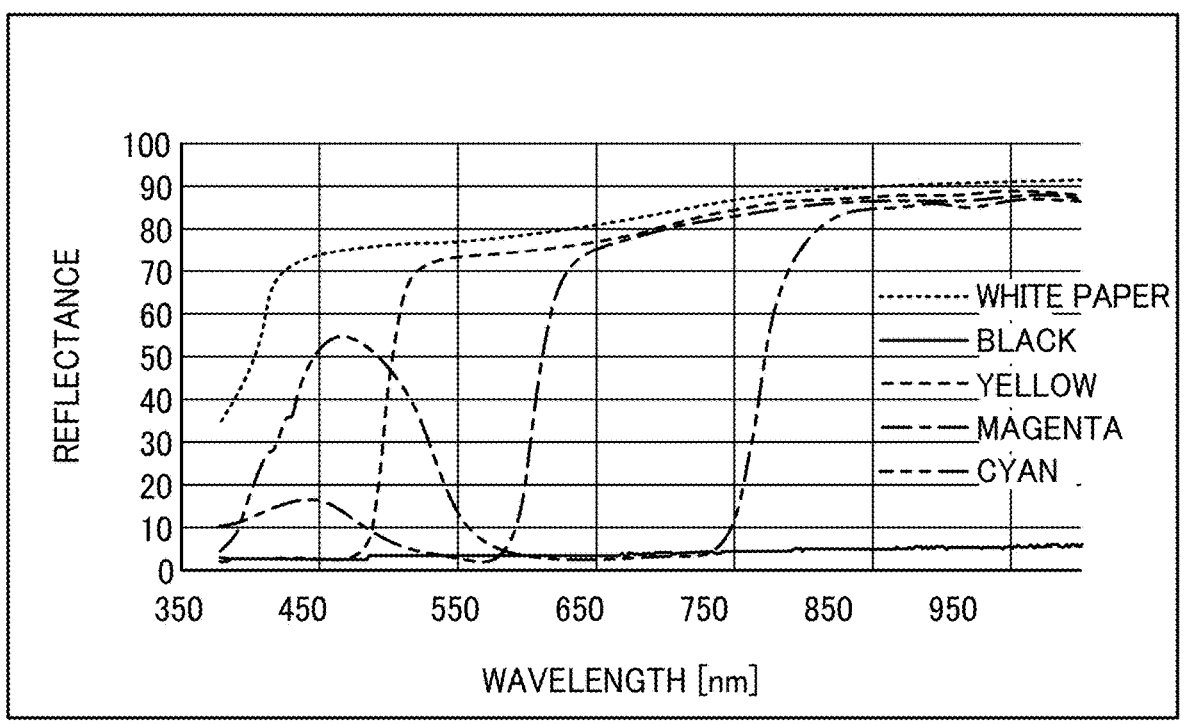
FIG. 5 is a graph illustrating a spectrum of toner or ink.

Referring now to FIG. 5, a description is given of a spectral characteristic of toner or ink in an infrared wavelength range.

FIG. 5 is a graph illustrating a spectrum of toner or ink.

As illustrated in FIG. 5, in a case in which toner or ink is used as a colorant, generally, the color colorants (e.g., CMY colorants) exhibit a relatively high transmittance in the infrared wavelength range near a wavelength of 850 nm; whereas the black (K) colorant exhibits a relatively high absorptance in the infrared wavelength range. Note that FIG. 5 is a graph obtained when the colorants placed on white paper are measured. That is, in FIG. 5, the CMY colorants in a relatively high transmittance exhibit a characteristic of white paper, in other words, a relatively high reflectance. Thus, the infrared wavelength range assigned as an invisible wavelength range allows the image reading device 101 to easily distinguish between K and CMY.

According to the example of the infrared wavelength range in FIG. 5, the text information exhibits a relatively high absorptance; whereas the ground pattern, ruled line, or imprint information exhibits a relatively high transmittance. The text information and the ground pattern, ruled line, or imprint information may exhibit other characteristics provided that the text information and the ground pattern, ruled line, or imprint information exhibit different characteristics from each other. For example, even in a case in which the text information exhibits a relatively high transmittance while the ground pattern, ruled line, or imprint information exhibits a relatively high absorptance, the image sensor 9 may selectively output the text information.

Taking advantage of the difference in optical characteristic in the invisible wavelength range, the image selector 21 identifies the colorant information, which is unidentifiable in the visible wavelength range (or color), according to the difference in optical characteristic in the invisible wavelength range.

That is, the image reading device 101 distinguishes between the individual colorants to selectively output the text information alone. Specifically, the image reading device 101 identifies the individual colorants upon reading of a document. Therefore, the image reading device 101 outputs the content information alone without being affected by the quality of a scanned image. Even in a case in which an imprint overlaps the content information, the image reading device 101 identifies and removes a colorant overlapping the content information according to the characteristic in the invisible wavelength range. Thus, the image reading device 101 removes the imprint with accuracy.

As described above, the image reading device 101 identifies and reads a colorant of an image in an invisible wavelength range. Accordingly, regardless of the quality of a scanned image, and even in a case in which the secondarily information such as an imprint overlaps the content information, the image reading device 101 removes the secondary information (i.e., ground pattern, ruled line, or imprint information) with accuracy, thus enhancing the readability of a document.

Taking the text information such as characters and numbers as an example of the content information, a description is now given of some advantages of the present embodiment.

Figure 6A:
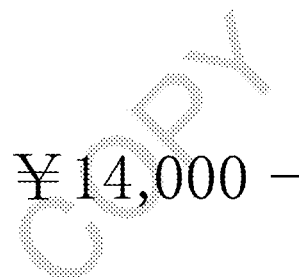
FIG. 6A is a diagram illustrating an image on a slip.
Figure 6B:
FIG. 6B is a diagram illustrating an invisible image as a result of invisible reading of the image of FIG. 6A.

Initially with reference to FIGS. 6A and 6B, a description is given of a first advantage against an impact of color shift.

As described above with reference to FIG. 5, in the present embodiment, the image reading device 101 reads an image according to the difference in optical characteristic (or physical property) of colorants in the invisible wavelength range. In other words, the image reading device 101 obtains, as an image, the colorant information instead of the color information. Since the text depicted in black is not colored due to color shift after scanning, the image reading device 101 recognizes the text as black text.

FIGS. 6A and 6B illustrate an example in which an amount of money is depicted in black as text on a slip with a background including a ground pattern "COPY" depicted in light color. Specifically, FIG. 6A is a diagram illustrating an image on the slip. FIG. 6B is a diagram illustrating an invisible image as a result of invisible reading of the image of FIG. 6A.

Upon reading the image on the slip illustrated in FIG. 6A with invisible light (i.e., infrared light), the image reading device 101 distinguishes between a black colorant and a color colorant. Accordingly, the image reading device 101 simply reads the amount of money depicted in black as illustrated in FIG. 6B.

A decreased quality of a scanned image may cause color shift or affect the read-color reproducibility. In order to avoid being affected by the quality of the scanned image, the image reading device 101 of the present embodiment identifies the colorants upon reading the image. In other words, the color shift and a decreased read-color reproducibility that appear as a result of reading does not affect a preceding stage, which is the invisible (i.e., infrared) reading to identify or distinguish between the colorants. Accordingly, the image reading device 101 removes the ground pattern alone from the slip without being affected by the quality of the scanned image, thereby enhancing the readability of the text information.

Figure 7A:
FIG. 7A is a diagram illustrating an image on a slip.

Referring now to FIGS. 7A and 7B, a description is given of a second advantage against an impact of an imprint overlapping text information.

FIGS. 7A and 7B illustrate an example in which a company name and a telephone number are written in black as text with a company stamp as a red imprint overlapping the text on a slip. Specifically, FIG. 7A is a diagram illustrating an image on the slip. FIG. 7B is a diagram illustrating an invisible image as a result of invisible reading of the image of FIG. 7A.

Upon reading the image on the slip illustrated in FIG. 7A with invisible light (i.e., infrared light), the image reading device 101 distinguishes between a black colorant and a color colorant. Accordingly, the image reading device 101 simply reads the company name and the telephone number depicted in black as illustrated in FIG. 7B.

That is, a text portion depicted with a black colorant is recognized as black and remains in the image while an imprint portion depicted with a color colorant is removed as illustrated in FIG. 7B. In short, the image reading device 101 does not remove part of the text erroneously. Identification of colorants allows the image reading device 101 to remove, from the text portion (originally in black), a color-colorant portion (in this case, a red portion) that is colored in red by overlapping or bleeding ink. Thus, the image reading device 101 correctly identifies the originally black text portion.

As described above, the image reading device 101 identifies the colorants, not the colors, even on a slip with an imprint overlapping text, to correctly recognize and selectively output the text. Thus, the image reading device 101 enhances the readability.

Figures 8A, 8B:
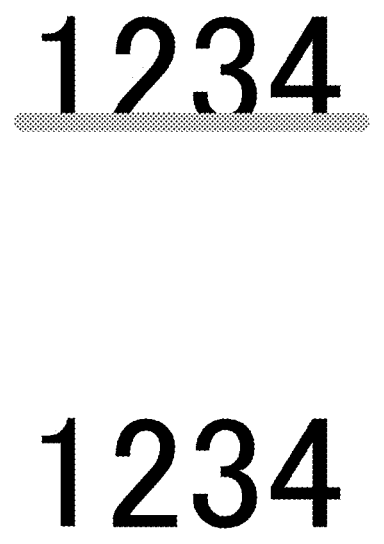

Referring now to FIGS. 8A and 8B, a description is given of a third advantage against an impact of a ruled line overlapping text information.

FIGS. 8A and 8B illustrate an example in which numbers are written in black as text with a color ruled line overlapping a lower portion of the text. Specifically, FIG. 8A is a diagram illustrating an image of the text and the ruled line. FIG. 8B is a diagram illustrating an invisible image as a result of invisible reading of the image of FIG. 8A.

Upon reading the image illustrated in FIG. 8A with invisible light (i.e., infrared light), the image reading device 101 distinguishes between a black colorant and a color colorant. Accordingly, the image reading device 101 simply reads the numbers depicted in black as illustrated in FIG. 8B.

That is, a numeral portion depicted with a black colorant is recognized as black and remains in the image while a ruled-line portion depicted with a color colorant is removed as illustrated in FIG. 8B. In short, the image reading device 101 does not remove part of the text erroneously. As described above with reference to FIGS. 7A and 7B, identification of colorants allows the image reading device 101 to remove, from the numbers (originally in black), a color-colorant portion that is colored by overlapping or bleeding ink. Thus, the image reading device 101 correctly identifies the originally black numbers.

As described above, the image reading device 101 identifies the colorants, not the colors, even in a case in which a ruled line overlaps numbers, to correctly recognize and selectively output the numbers. Thus, the image reading device 101 enhances the readability.

Note that FIGS. 6A to 8B illustrate the examples in which the image reading device 101 reads the images with the infrared light. The image reading device 101 exhibits substantially the same advantages even in a case in which the image reading device 101 reads the images with invisible light (e.g., ultraviolet light) other than the infrared light.

Figure 9A:
FIG. 9A is a diagram illustrating an image of a code and a ruled line.
Figure 9B:
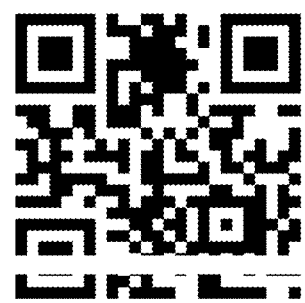
FIG. 9B is a diagram of a result of color dropout processing on the image of FIG. 9A subjected to visible reading.
Figure 9C:
FIG. 9C is a diagram illustrating an invisible image as a result of invisible reading of the image of FIG. 9A.

Referring now to FIGS. 9A to 9C, a description is given of enhancing the readability of code information.

Although the readability of text information has been described above, the content information of a document is not limited to the text information such as characters and numbers. The content information may be often encrypted code information such as a barcode or a Quick Response (QR) code (registered trademark). In the present embodiment, the invisible reading is also applied to the code information to enhance the readability of code, that is, the recognition rate of code.

FIGS. 9A to 9C illustrate an example in which a QR code is depicted in black with a color ruled line overlapping a lower portion of the QR code. Specifically, FIG. 9A is a diagram illustrating an image of the QR code and the ruled line. FIG. 9B is a diagram of a result of color dropout processing on the image of FIG. 9A subjected to visible (i.e., RGB) reading. FIG. 9C is a diagram illustrating an invisible image as a result of invisible reading of the image of FIG. 9A.

When the image illustrated in FIG. 9A is subjected to general RGB reading and the color dropout processing, part of the QR code is whitened as illustrated in FIG. 9B, hampering recognition of the QR code. By contrast, the image reading device 101 of the present embodiment reads the image of FIG. 9A with invisible light (i.e., infrared light). As described above with reference to FIG. 8B, the image reading device 101 simply reads the QR code depicted in black as illustrated in FIG. 9C, thus facilitating recognition of the QR code.

Thus, the present embodiment enhances the readability (i.e., recognition rate) of code even in a case in which a ruled line overlaps the code information such as a barcode or a QR code.

As described above, the present embodiment enhances the readability of a document or code with, e.g., a ground pattern.

As described above with reference FIG. 5, the image reading device 101 easily identifies the colorants according to the different characteristics of colorants in the infrared range. Specifically, in FIG. 5, the color colorants such as CMY colorants exhibit a relatively high transmittance in the infrared range; whereas the black (K) colorant exhibits a relatively high absorptance in the infrared range. Inclusion of a material called carbon black often determines such infrared characteristics, specifically, relatively high transmittance and absorptance of the color colorants and the black colorant, respectively, in the infrared wavelength range. The carbon black is a fine powder of carbon obtained by thermal decomposition of, e.g., natural gas or petroleum. The carbon black is a black material having an absorption characteristic in the near-infrared range.

That is, information depicted with a black colorant containing carbon black indicates a characteristic of absorbing invisible light; whereas information depicted with a color colorant containing no carbon black indicates a characteristic of transmitting the invisible light. In other words, the characteristics are different from each other depending on whether or not the colorants of the information include carbon black.

Accordingly, among colorants, use of the color colorant containing no carbon black and the black colorant containing carbon black in combination facilitates identification of the colorants in the near-infrared wavelength range.

Figure 10:
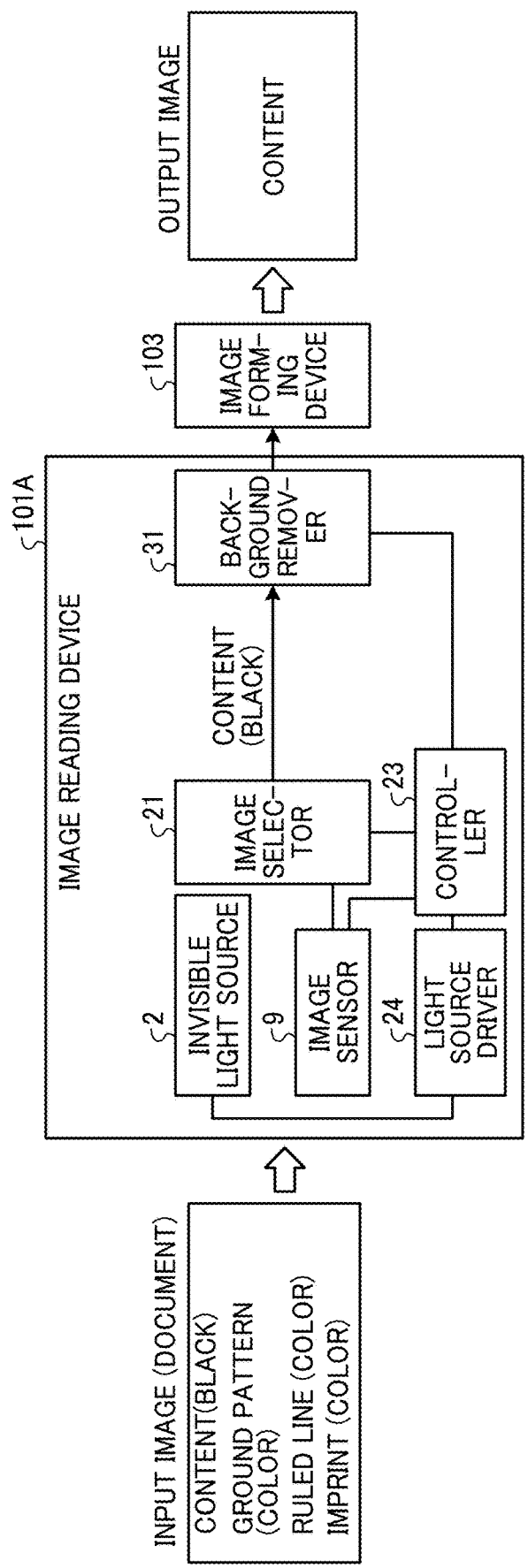
FIG. 10 is a block diagram illustrating electric connections of components of an image reading device according to a second embodiment of the present disclosure.
Figures 11A, 11B, 11C:
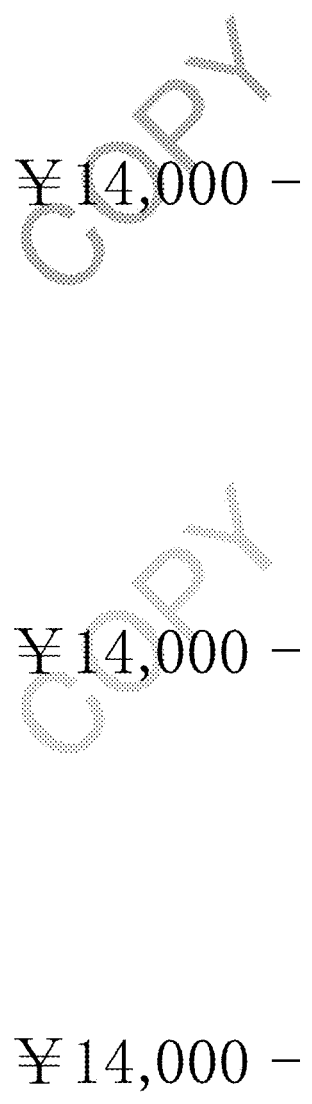

Referring now to FIGS. 10 to 11C, a description is given of a second embodiment of the present disclosure.

As is clear from the spectral characteristics of toner or ink illustrated in FIG. 5, generally, a cyan colorant has a lower transmittance in the infrared wavelength range than the transmittances of a magenta colorant and a yellow colorant. In a case in which a ground pattern is printed in a dark color such as cyan or blue, the ground pattern might be insufficiently removed even when an image including the ground pattern is read with infrared light.

Unlike the first embodiment, a background is removed from an invisible image in the second embodiment to sufficiently remove a cyan colorant. A redundant description of identical features in the first and second embodiments is herein omitted; whereas a description is now given of features of the second embodiment different from the features of the first embodiment.

FIG. 10 is a block diagram illustrating electric connections of components of an image reading device 101A according to the second embodiment of the present disclosure.

As illustrated in FIG. 10, the image reading device 101A includes a background remover 31 serving as a background removing unit, in addition to the components of the image reading device 101 illustrated in FIG. 3.

The background remover 31 removes a background from an invisible image, which is an image read with invisible light.

In other words, the background remover 31 serving as a background removing unit removes a background other than the first information.

The background remover 31 outputs the image with the background removed, to the image forming device 103. Such a removal of the background from the invisible image allows a sufficient removal of a cyan colorant.

Referring now to FIGS. 11A to 11C, a description is given of an advantage attained by removing a background from an invisible image.

FIGS. 11A to 11C illustrate an example in which a ground pattern "COPY" is depicted in dark cyan. Specifically, FIG. 11A is a diagram illustrating an image of text and the ground pattern. FIG. 11B is a diagram illustrating an invisible image as a result of invisible reading of the image of FIG. 11A. FIG. 11C is a diagram illustrating a result of a background removal.

When the image reading device 101A reads the image illustrated in FIG. 11A with infrared light, a ground pattern in light color might be sufficiently removed, while the ground pattern in dark color is not sufficiently removed and remains on the image as illustrated in FIG. 11B. To address such a situation, the image reading device 101A removes the background from the invisible image to sufficiently remove the ground pattern as illustrated in FIG. 11C.

Thus, even in a case in which the background is in dark cyan, the present embodiment enhances the readability with a background removal.

Note that adjustment of a scanner gamma ($\gamma$) characteristic facilitates implementation of the background removal. As illustrated in FIG. 11B, even in a case in which the ground pattern remains, the ground pattern remains in light color, resulting in a clear difference in reading level between the black text or money information (e.g., 20 digits) and the ground pattern "COPY" (e.g., 100 digits). Therefore, the background remover 31 easily implements the background removal by binarization using the difference in reading level. In other words, the background remover 31 serving as a background removing unit removes the background by binarization. In this case, since the black portion is darkened, the visibility of the content is also enhanced.

Referring now to FIGS. 12 to FIG. 14C, a description is given of a third embodiment of the present disclosure.

Throughout the examples described above, the content information is depicted in black. For example, in a case in which money information is corrected with a red line, the information depicted in color included in the content is removed in invisible (i.e., infrared) reading. In this case, the information to be recognized is lost, causing erroneous recognition of the information.

To address such a situation, unlike the first and second embodiments, the image sensor 9 reads an image with visible light and outputs the image as an RGB image, in addition to the image read with invisible light as an IR image in the third embodiment. Thus, the present embodiment prevents erroneous recognition of the information even in a case in which a color content to be recognized is removed. A redundant description of identical features in the first to third embodiments is herein omitted; whereas a description is now given of features of the third embodiment different from the features of the first and second embodiments.

Figure 12:
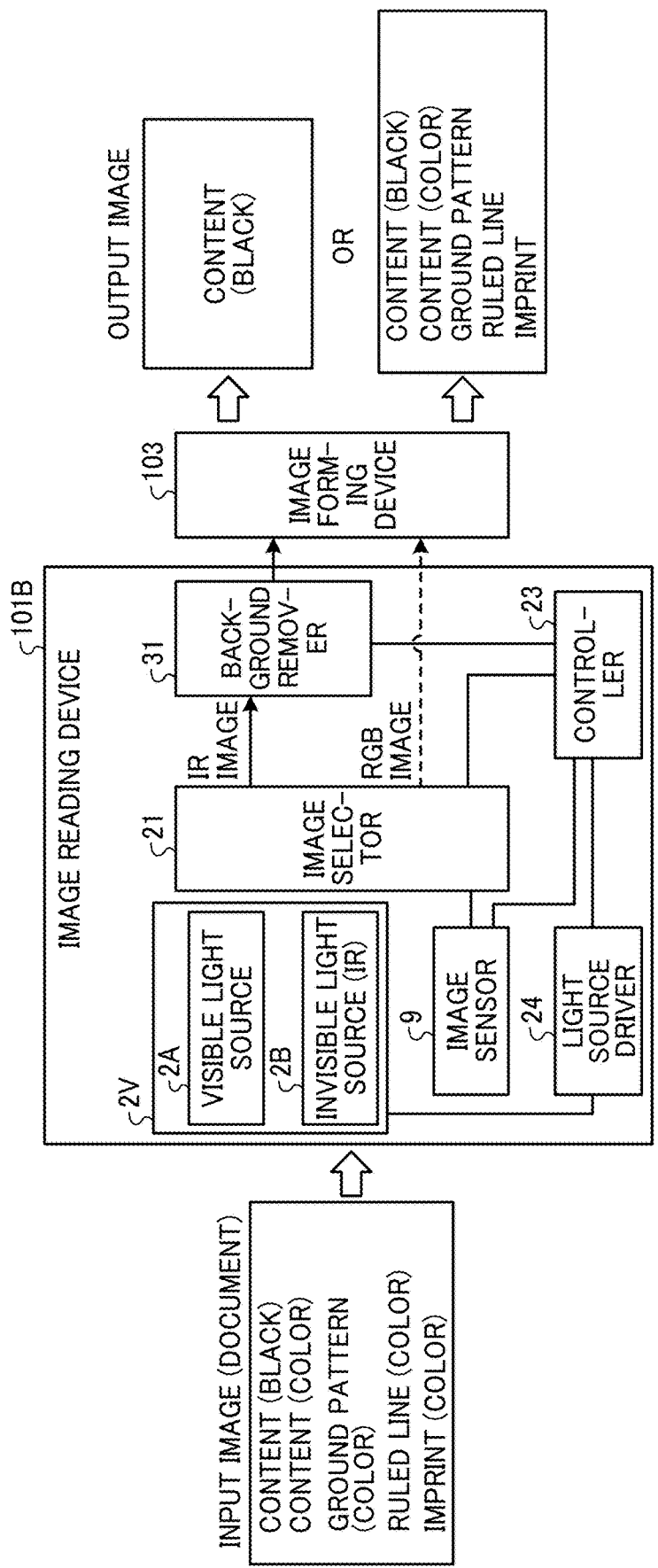
FIG. 12 is a block diagram illustrating electric connections of components of an image reading device according to a third embodiment of the present disclosure.

FIG. 12 is a block diagram illustrating electric connections of components of an image reading device 101B according to the third embodiment of the present disclosure.

As illustrated in FIG. 12, a light source 2V of the image reading device 101B of the third embodiment is a visible/NIR light source that includes a visible light source 2A and a near-infrared light source 2B as an invisible light source.

The image selector 21 selects an IR image or an RGB image. In FIG. 12, the image selector 21 outputs the RGB image and the IR image to the image forming device 103 and the background remover 31, respectively. At this time, the RGB image holds all the information of an input image, including the ground pattern, ruled line, or imprint information in addition to the content information. Note that the input image (i.e., document) herein includes content depicted in color, in addition to content depicted in black.

As described above, adding the image read with visible light (i.e., RGB image) allows the content information to be checked. Accordingly, in a case in which the content to be recognized is removed because the content is depicted in color, the present embodiment prevents erroneous recognition of information.

Note that the RGB image does not pass through the background remover 31 in FIG. 12. Alternatively, the RGB image may pass through the background remover 31.

Thus, the light source 2V irradiates an object with visible light. The image sensor 9 serving as an image reader reads third information included in the object and obtainable in response to the object being irradiated with the visible light. The image selector 21 serving as an image selecting unit outputs the third information read by the image sensor 9.

Referring now to FIG. 13, a description is given of a flow of an image reading process performed under the control of the controller 23.

FIG. 13 is a schematic flowchart of the image reading process performed by the image reading device 101B described above.

As illustrated in FIG. 13, firstly in step S1, the controller 23 causes the light source driver 24 to turn on the visible light source 2A alone of the light source 2V.

In step S2, the controller 23 causes the image sensor 9 to read a visible image.

Subsequently in step S3, the controller 23 causes the light source driver 24 to turn off the visible light source 2A of the light source 2V.

In step S4, the controller 23 causes the light source driver 24 to turn on the near-infrared light source 2B alone of the light source 2V.

In step S5, the controller 23 causes the image sensor 9 to read an invisible image.

Subsequently in step S6, the controller 23 causes the light source driver 24 to turn off the near-infrared light source 2B of the light source 2V. Thus, the image reading process ends.

Note that, in the above-described flow of the present embodiment, the image sensor 9 reads the visible image first. Alternatively, the image sensor 9 may read the invisible image first.

Such an image reading process facilitates reading of an image with invisible light (e.g., infrared light) and the image with visible light.

Figure 14A:
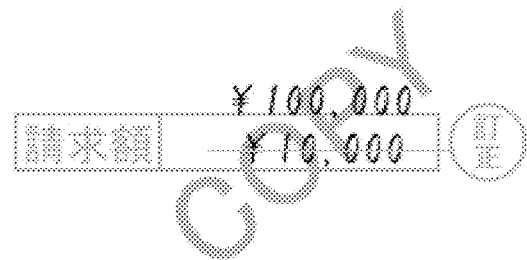
FIG. 14A is a diagram illustrating an image on a slip.
Figure 14C:
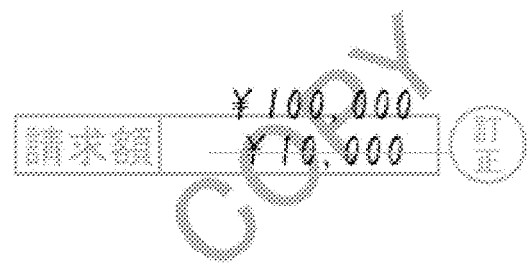
FIG. 14C is a diagram illustrating a visible image as a result of visible reading of the image of FIG. 14A.

Referring now to FIGS. 14A to 14C, a description is given of an advantage of adding an image read with visible light (i.e., RGB image).

FIGS. 14A to 14C illustrate an example in which an amount of money "¥10,000" is depicted in black as money information on a slip with a ground pattern "COPY" depicted in color together with text meaning "billing amount" and a frame. The amount of money "¥10,000" depicted in the frame is corrected with a color horizontal line to another amount of money "¥100,000" that is depicted in black as another piece of money information. Specifically, FIG. 14A is a diagram illustrating an image on the slip. FIG. 14B is a diagram illustrating an invisible image as a result of invisible reading of the image of FIG. 14A. FIG. 14C is a diagram illustrating a visible image as a result of visible reading of the image of FIG. 14A.

In other words, the colorant of the text meaning "billing amount" and the frame rests on the colorant of the ground pattern. The colorant of the money information rests on the colorant of the text and the frame. The colorant of the horizontal correction line and the correction mark rests on the colorant of the money information.

When the image reading device 101B reads the image illustrated in FIG. 14A with infrared light, the money information remains alone, without color portions, as illustrated in FIG. 14B. The color portions thus removed include the color horizontal line depicted to correct the amount of money "¥10,000". As a result, two kinds of money information "¥10,000" and "¥100,000" remain unclear as information to be recognized, leading erroneous recognition of the amount of money.

To address such a situation, in the configuration illustrated in FIG. 12, an image read with visible light as illustrated in FIG. 14C is added. Confirmation of the information on the visible image together with the information on the invisible image allows recognition of the amount of money "¥100,000" as correct money information. Thus, the present embodiment prevents erroneous recognition of the amount of money.

As described above, according to the present embodiment, an image read with visible light (i.e., RGB image) is added, allowing the content information to be checked with the RGB image. Accordingly, in a case in which the content to be recognized is removed because the content is depicted in color, the present embodiment prevents erroneous recognition of information.

Figure 16:
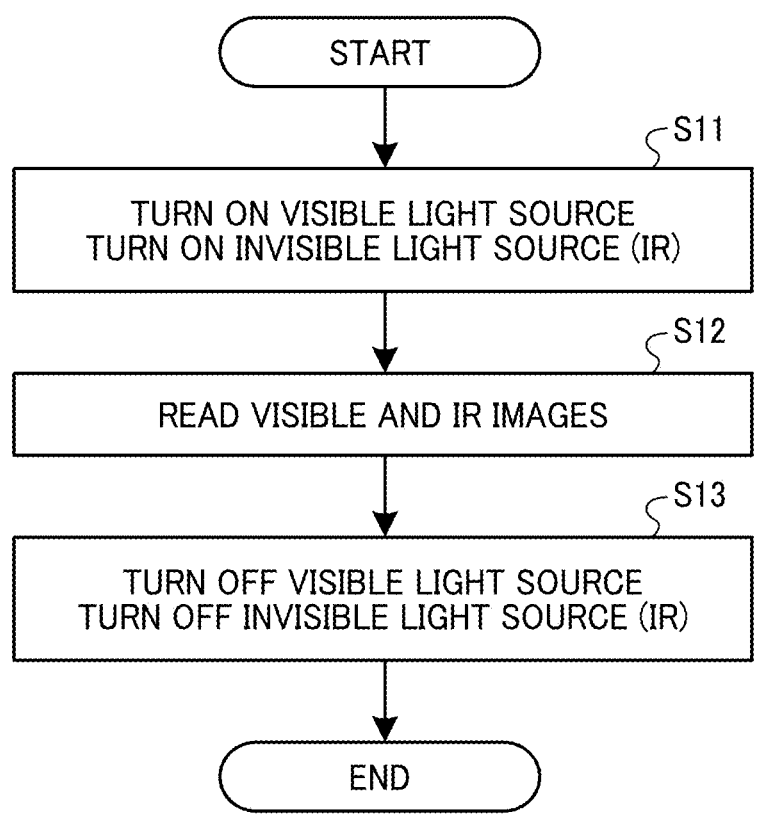
FIG. 16 is a schematic flowchart of an image reading process performed by the image reading device of FIG. 15.

Referring now to FIGS. 15 and 16, a description is given of a fourth embodiment of the present disclosure.

In the configuration illustrated in FIG. 12, an image read with visible light (i.e., RGB image) is added, allowing the content information to be checked. Since the image reading device 101B performs the reading operation twice, the reading operation takes time.

To address such a situation, unlike the first to third embodiments, an image reading device 101C obtains an image read with invisible light (i.e., IR image) and an image read with visible light (i.e., RGB image) at once in the fourth embodiment. Thus, the present embodiment shortens the time taken to check the content information. A redundant description of identical features in the first to fourth embodiments is herein omitted; whereas a description is now given of features of the fourth embodiment different from the features of the first to third embodiments.

FIG. 15 is a block diagram illustrating electric connections of components of the image reading device 101C according to the fourth embodiment of the present disclosure.

As illustrated in FIG. 15, the image selector 21 outputs an IR image and an RGB image at once.

Note that the image sensor 9 illustrated in FIG. 15 is a four-line (i.e., RGB and IR) image sensor.

In FIG. 15, the RGB image does not pass through the background remover 31. Alternatively, the RGB image may pass through the background remover 31.

Referring now to FIG. 16, a description is given of a flow of an image reading process performed under the control of the controller 23. In the present embodiment, a visible image and an invisible image are obtained at once.

FIG. 16 is a schematic flowchart of the image reading process performed by the image reading device 101C described above.

As illustrated in FIG. 16, firstly in step S11, the controller 23 causes the light source driver 24 to turn on the visible light source 2A of the light source 2V and turn on the near-infrared light source 2B of the light source 2V.

In step S12, the controller 23 causes the image sensor 9 to read a visible image and an invisible image with both the visible light source 2A and the near-infrared light source 2B turned on.

Subsequently in step S13, the controller 23 causes the light source driver 24 to turn off the visible light source 2A of the light source 2V and turn off the near-infrared light source 2B of the light source 2V.

Thus, the image reading process ends.

Thus, the image reading device 101C reads an image with invisible (i.e., infrared) light and visible light at once.

In other words, the image sensor 9 serving as an image reader reads the third information and one of the first information and the second information at once.

As described above, according to the present embodiment, the image reading device 101C obtains an image read with visible light (i.e., RGB image) and an image read with invisible light (i.e., IR image) at once to shorten the time taken to check the content information.

Referring now to FIGS. 17 to 20, a description is given of a fifth embodiment of the present disclosure.

Throughout the examples described above, the content information is depicted in black. However, the content information may be depicted in color in some documents. Invisible (i.e., infrared) reading of such documents may lose the content information depicted in color.

To address such a situation, unlike the first to fourth embodiments, an image reading device 101D synthesizes an image read with invisible light (i.e., IR image) and an image read with visible light (i.e., RGB image) without removing color content information (specifically, part of non-common information of the RGB image and the IR image) in the fifth embodiment. Thus, the present embodiment prevents the loss of the color content information. A redundant description of identical features in the first to fifth embodiments is herein omitted; whereas a description is now given of features of the fifth embodiment different from the features of the first to fourth embodiments.

Figure 17:
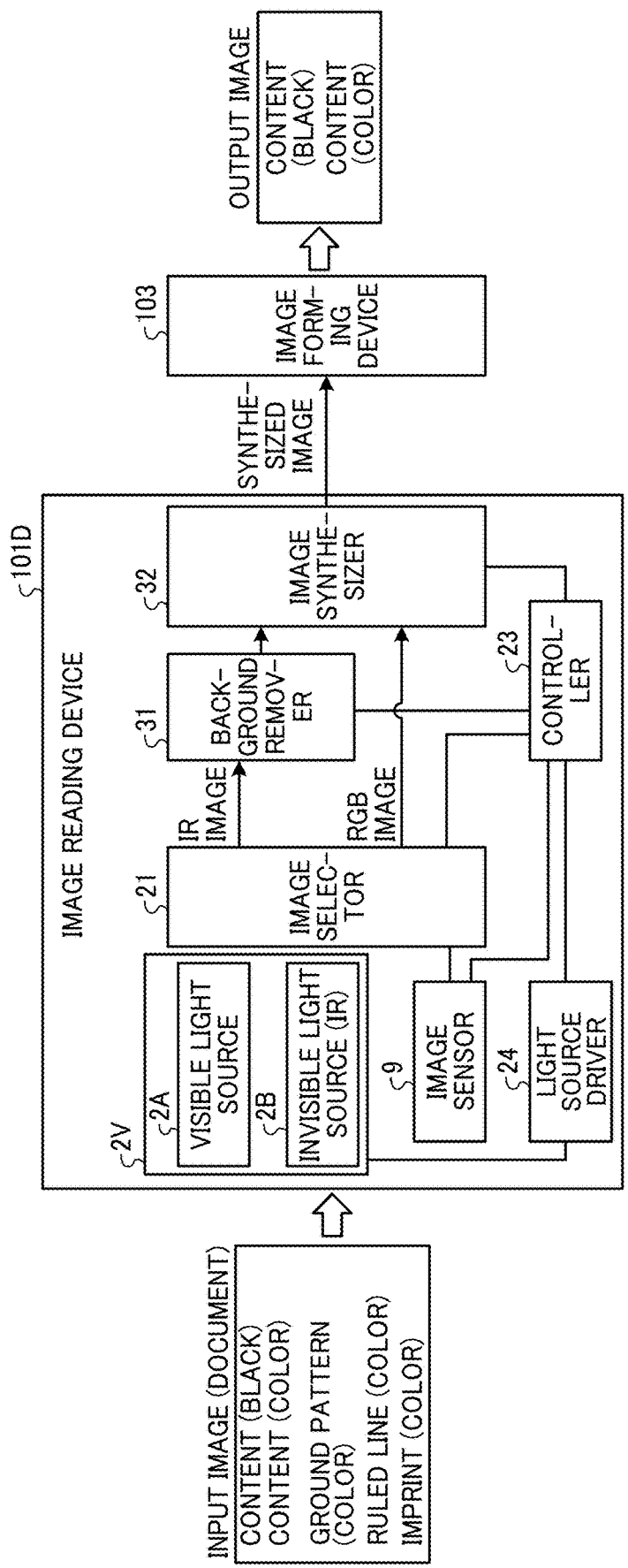
FIG. 17 is a block diagram illustrating electric connections of components of an image reading device according to a fifth embodiment of the present disclosure.

FIG. 17 is a block diagram illustrating electric connections of components of the image reading device 101D according to the fifth embodiment of the present disclosure.

As illustrated in FIG. 17, the image reading device 101D includes an image synthesizer 32 serving as an image synthesizing unit.

The image synthesizer 32 obtains an image read with visible light (i.e., RGB image) and an image read with invisible light (i.e., IR image) and synthesizes the RGB image and the IR image to generate a synthesized image.

In other words, the image synthesizer 32 serving as an image synthesizing unit synthesizes the first information and the third information to generate a synthesized image.

Specifically, the image synthesizer 32 synthesizes the RGB image and the IR image without removing part of non-common information of the RGB image and the IR image. The image synthesizer 32 then outputs content information depicted in black and content information depicted in color.

In other words, the image synthesizer 32 serving as an image synthesizing unit does not remove part of non-common information of the first information and the third information.

Figure 18:
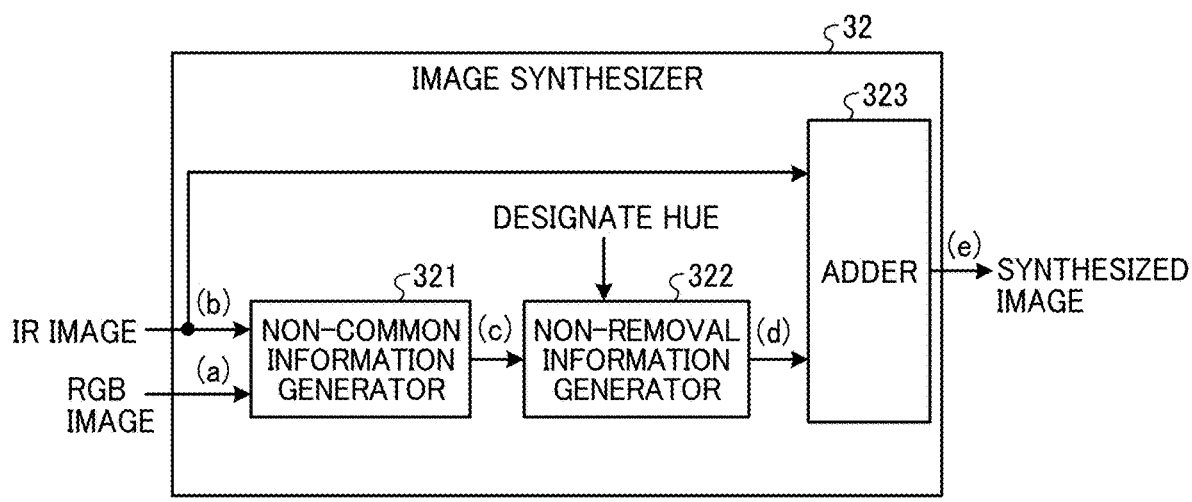
FIG. 18 is a block diagram illustrating a configuration of an image synthesizer included in the image reading device of FIG. 17.

FIG. 18 is a block diagram illustrating a configuration of the image synthesizer 32 included in the image reading device 101D described above.

As illustrated in FIG. 18, the image synthesizer 32 includes a non-common information generator 321, a non-removal information generator 322, and an adder 323.

The non-common information generator 321 detects non-common information of input RGB and IR images. The non-common information herein corresponds to color content information. The non-common information generator 321 outputs the detected non-common information to the non-removal information generator 322.

The non-removal information generator 322 selects information not to be removed, as non-removal information, from the non-common information input from the non-common information generator 321. The non-removal information generator 322 herein selects the non-removal information by hue. That is, in the color content information, blue is a removal target while red is not a removal target. The non-removal information generator 322 outputs the selected information to the adder 323.

The adder 323 synthesizes the information selected by the non-removal information generator 322 and the IR image. That is, the adder 323 outputs, as a synthesized image, the IR image (i.e., black content information) to which part of the color content information is added.

In other words, the image synthesizer 32 serving as an image synthesizing unit detects non-common information of the first information and the third information. The image synthesizer 32 then selects non-removal information not to be removed from the non-common information. The image synthesizer 32 then adds the non-removal information to the first information. Thus, the image synthesizer 32 does not remove part of the non-common information of the first information and the third information. The image synthesizer 32 selects the non-removal information according to hue information.

Figure 19A:
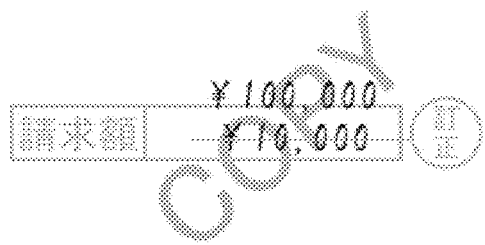
FIG. 19A is a diagram illustrating an image on the slip.
Figure 19B:
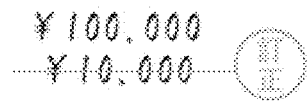
FIG. 19B is a diagram illustrating content information to be left.

Referring now to FIGS. 19A and 19B, a description is given of an advantage of not removing part of non-common information.

FIGS. 19A and 19B illustrate an example in which an amount of money "¥10,000" is written in black as money information on a slip with a ground pattern "COPY" depicted in color. The amount of money "¥10,000" is corrected with a color horizontal line to another amount of money "¥100,000" that is written in black as another piece of money information. Specifically, FIG. 19A is a diagram illustrating an image on the slip. FIG. 19B is a diagram illustrating content information to be left.

As illustrated in FIG. 19B, the content information to be left is herein content information depicted in black and content information depicted in color, namely, the money information, the horizontal correction line, and a correction mark.

Figure 20:
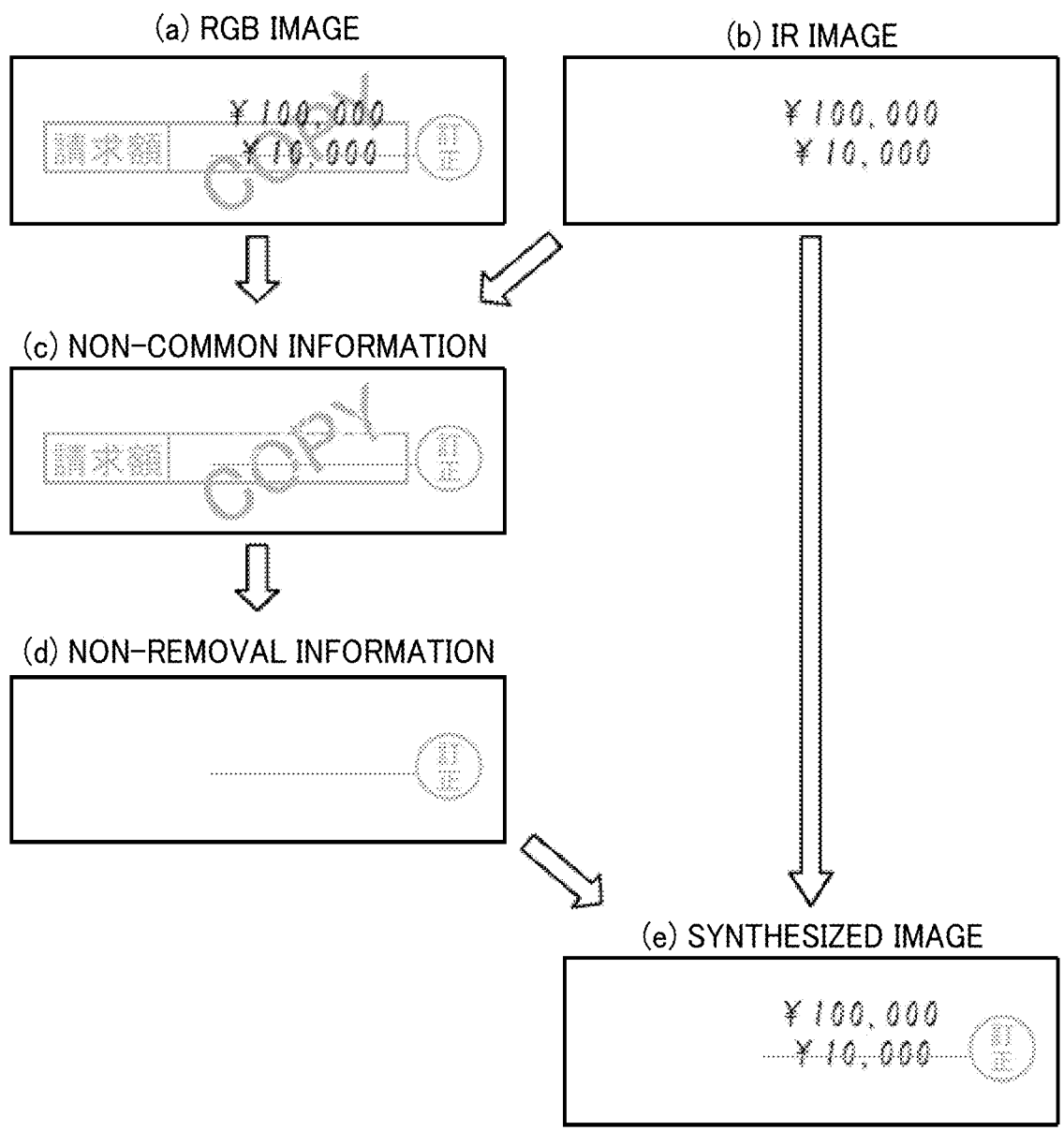
FIG. 20 is a diagram illustrating a process of generating a synthesized image without removing part of non-common information according to the fifth embodiment of the present disclosure.

Referring now to FIG. 20, a description is given of a process of generating a synthesized image without removing part of non-common information according to the fifth embodiment.

FIG. 20 is a diagram illustrating the process of generating a synthesized image without removing part of non-common information.

As illustrated in FIG. 20, the image synthesizer 32 (specifically, the non-common information generator 321) generates non-common information (c) from an RGB image (a) and an IR image (b). The non-common information (c) is herein information that appears on the RGB image (a), not on the IR image (b). In other words, the non-common information (c) is information depicted in color, namely, a ground pattern "COPY," text meaning "billing amount," a ruled line, the correction line, and the correction mark. Removing the image of the money information read as the IR image as in simple color dropout processing whitens part of the non-common information in common with the money information.

Subsequently, the image synthesizer 32 (specifically, the non-removal information generator 322) selects, as non-removal information (d), part of the non-common information (c) by hue. The part of the non-common information (c) is specifically the information of the horizontal correction line and the correction mark. Note that, the image synthesizer 32 may herein simply leave the correction line and the correction mark. Alternatively, the image synthesizer 32 may perform color dropout processing to remove information other than the correction line and the correction mark. The color content information herein includes the ground pattern "COPY," the text meaning "billing amount," the ruled line, the horizontal correction line, and the correction mark depicted in different hues. The non-removal information (d) is an image in which the correction line depicted on top of the other information simply remains together with the correction mark.

Then, the image synthesizer 32 (specifically, the adder 323) adds the selected non-removal information (d) to the IR image to generate a synthesized image (e).

As described above, according to the present embodiment, the image synthesizer 32 detects non-common information of an RGB image and an IR image and synthesizes part of the non-common information and the IR image. Accordingly, even in a case in which the information to be recognized is depicted in color, the present embodiment prevents erroneous recognition of the information and enhances the readability.

Figure 21:
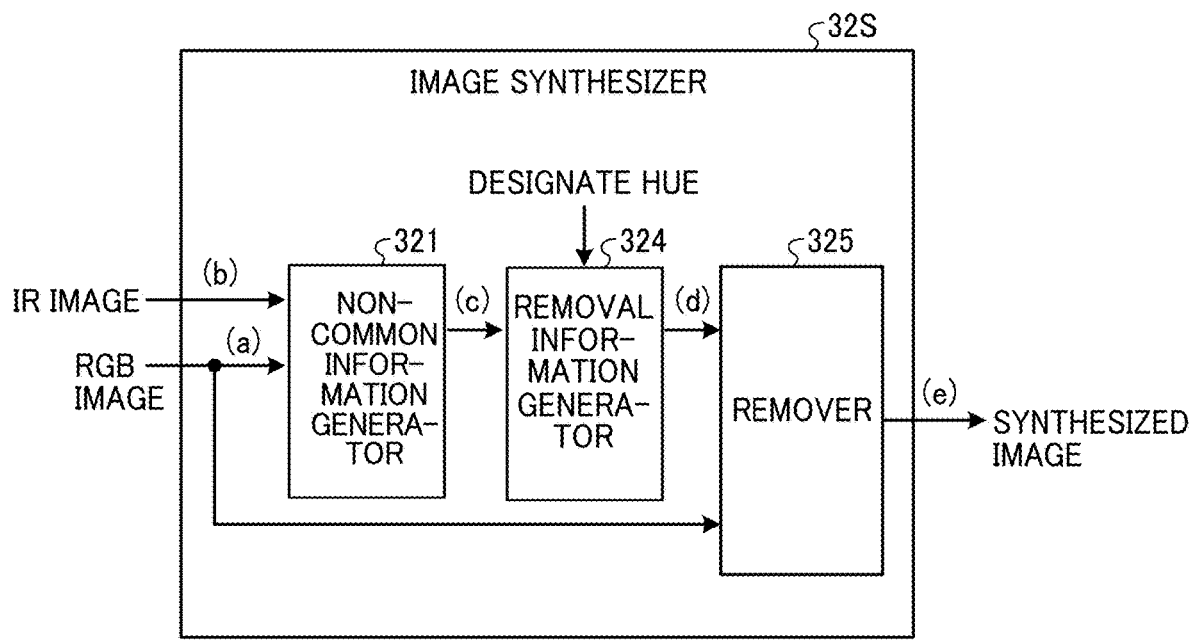
FIG. 21 is a block diagram illustrating a configuration of an image synthesizer according to a sixth embodiment of the present disclosure.
Figure 22:
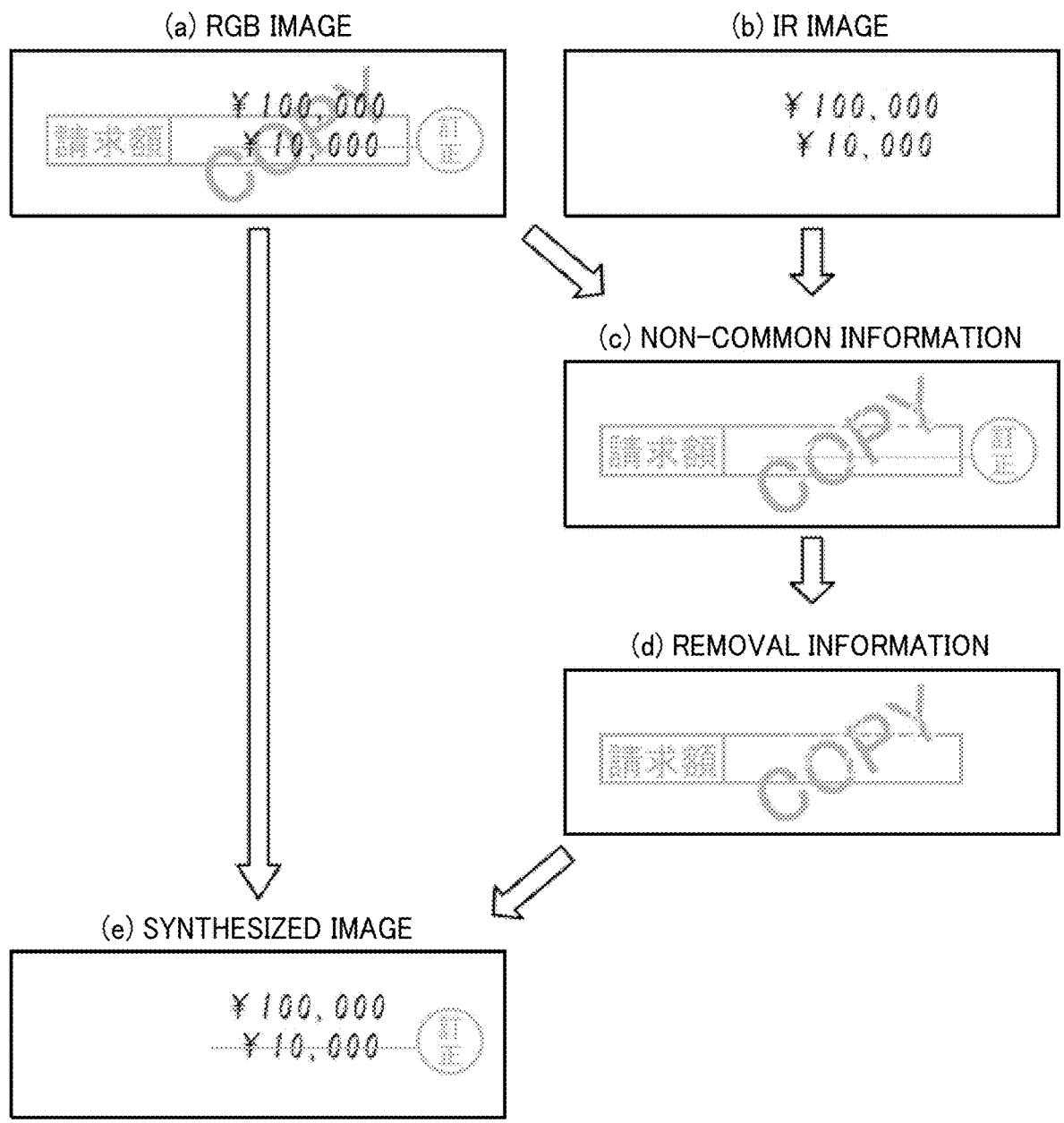
FIG. 22 is a diagram illustrating the process of generating a synthesized image without removing part of non-common information according to the sixth embodiment of the present disclosure.

Referring now to FIGS. 21 and 22, a description is given of a sixth embodiment of the present disclosure.

With the configuration illustrated in FIG. 18, the image reading device 101D generates a synthesized image based on an IR image. Information in the IR image may be decreased in image quality such as resolution, hampering clear identification of the information.

To address such a situation, unlike the first to fifth embodiments, an image synthesizer 32S generates a synthesized image based on an RGB image in the sixth embodiment. Thus, the present embodiment maintains the image quality of information. A redundant description of identical features in the first to sixth embodiments is herein omitted; whereas a description is now given of features of the sixth embodiment different from the features of the first to fifth embodiments.

FIG. 21 is a block diagram illustrating a configuration of the image synthesizer 32S according to the sixth embodiment.

As illustrated in FIG. 21, the image synthesizer 32S includes the non-common information generator 321, a removal information generator 324, and a remover 325.

The non-common information generator 321 detects non-common information of input RGB and IR images. The non-common information herein corresponds to color content information. The non-common information generator 321 outputs the detected non-common information to the removal information generator 324.

The removal information generator 324 selects information to be removed, as removal information, from the non-common information input from the non-common information generator 321. The removal information generator 324 herein selects the removal information by hue. The removal information generator 324 outputs the selected information to the remover 325.

The remover 325 synthesizes the information selected by the removal information generator 324 and the RGB image. That is, the remover 325 outputs, as a synthesized image, the RGB image (i.e., all the content information) from which part of the color content information is removed.

In other words, the image synthesizer 32S serving as an image synthesizing unit detects non-common information of the first information and the third information. The image synthesizer 32S then selects removal information to be removed from the non-common information. The image synthesizer 32S then removes the removal information from the third information. Thus, the image synthesizer 32S does not remove part of the non-common information of the first information and the third information. The image synthesizer 32S selects the removal information according to hue information.

Referring now to FIG. 22, a description is given of a process of generating a synthesized image without removing part of non-common information according to the sixth embodiment.

FIG. 22 is a diagram illustrating the process of generating a synthesized image without removing part of non-common information.

As illustrated in FIG. 22, the image synthesizer 32S (specifically, the non-common information generator 321) generates non-common information (c) from an RGB image (a) and an IR image (b). The non-common information (c) is herein information that appears on the RGB image (a), not on the IR image (b). In other words, the non-common information (c) is information depicted in color, namely, a ground pattern "COPY," text meaning "billing amount," a ruled line, a correction line, and a correction mark.

Subsequently, the image synthesizer 32S (specifically, the removal information generator 324) selects, as removal information (d), part of the non-common information (c) by hue. The part of the non-common information (c) is specifically the information of the ground pattern "COPY," the text meaning "billing amount," and the ruled line. Note that, the image synthesizer 32S may herein simply leave the ground pattern, the text meaning "billing amount," and the ruled line. Alternatively, the image synthesizer 32S may perform color dropout processing to remove information other than the ground pattern, the text meaning "billing amount," and the ruled line. The removal information (d) is an image in which the ground pattern, the text meaning "billing amount," and the ruled line remain, while being partially whitened in an area in common with money information, the correction line, and the correction mark. Note that the color content information herein includes the ground pattern "COPY," the text meaning "billing amount," the ruled line, the horizontal correction line, and the correction mark depicted in different hues.

Then, the image synthesizer 32S (specifically, the remover 325) removes the selected removal information (d) from the RGB image to generate a synthesized image (e). The image synthesizer 32S herein removes, as a removal image, an image of the removal information (d) from the RGB image (a) to generate the synthesized image (e). In the removal image, however, the area or portion in common with the money information, the correction line, and the correction mark is whitened. The image synthesizer 32S does not remove the whitened portion from the RGB image (a). Accordingly, even in a case in which the image synthesizer 32S performs simple dropout processing to remove the removal image, the image synthesizer 32S reliably removes the removal image and maintains an enhanced readability.

As described above, according to the present embodiment, the image synthesizer 32S detects non-common information of an RGB image and an IR image and removes part of the non-common information from the IR image. Accordingly, the present embodiment maintains the image quality of information identical to the image quality of the RGB image, thus maintaining the image quality of extracted content information.

Referring now to FIGS. 23 to 26, a description is given of a seventh embodiment of the present disclosure.

In the example described above with reference to FIG. 17, the content information is depicted in color. In a case in which text is depicted with, e.g., ball-point pen ink, the text duplicated on carbonless copy paper is black content information depicted with a black, carbonless colorant. Invisible (i.e., infrared) reading of such carbonless copy paper may lose the content information.

To address such a situation, unlike the first to sixth embodiments, an image reading device 101E synthesizes images without removing black content information in the seventh embodiment. That is, whether the black content information is carbon black content information or whether the black content information is carbonless black content information, the image reading device 101E synthesizes images without removing the black content information. Thus, the present embodiment prevents the loss of carbonless black content information. A redundant description of identical features in the first to seventh embodiments is herein omitted; whereas a description is now given of features of the seventh embodiment different from the features of the first to sixth embodiments.

Figure 23:
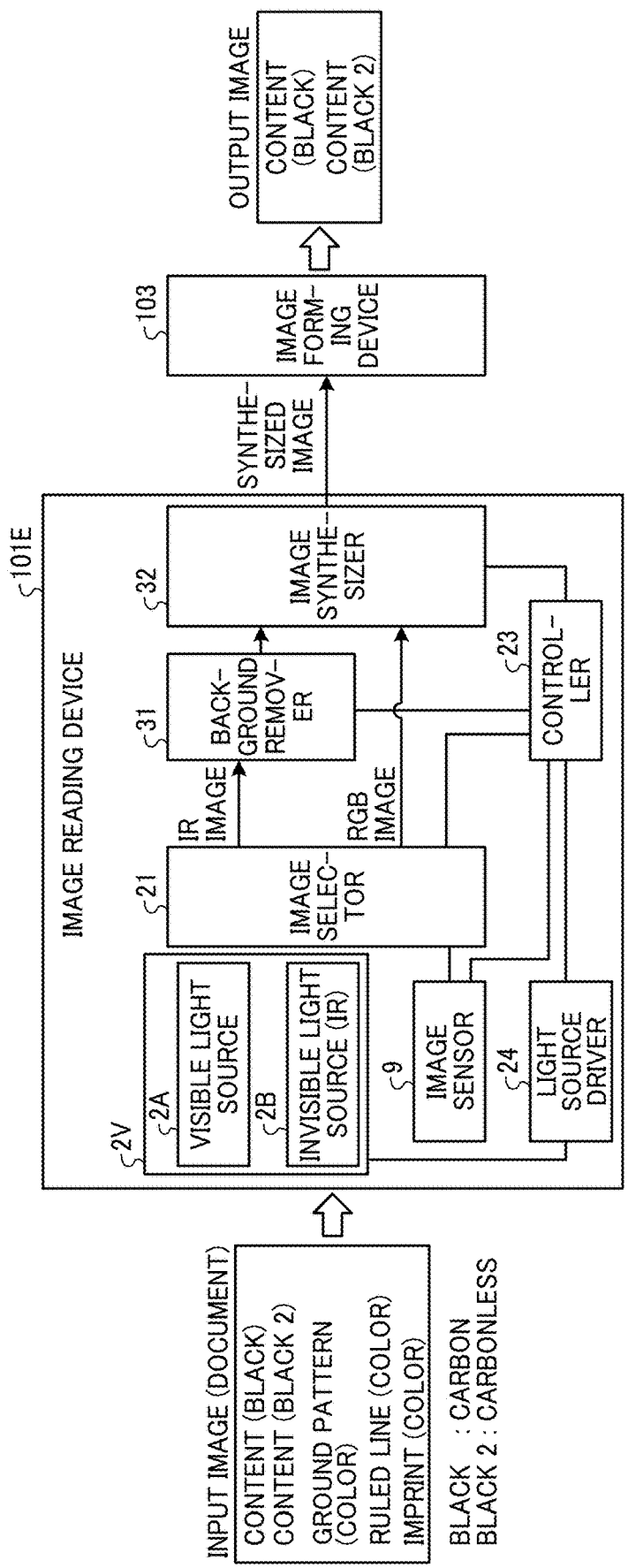
FIG. 23 is a block diagram illustrating electric connections of components of an image reading device according to a seventh embodiment of the present disclosure.

FIG. 23 is a block diagram illustrating electric connections of components of the image reading device 101E according to the seventh embodiment of the present disclosure.

As illustrated in FIG. 23, an input image to the image reading device 101E includes content (black) depicted with a carbon black colorant and content (black 2) depicted with a carbonless black colorant. The image synthesizer 32 synthesizes an RGB image and an IR image to generate a synthesized image. The image synthesizer 32 thus outputs content information depicted with either a carbon colorant or a carbonless colorant.

Figure 24:
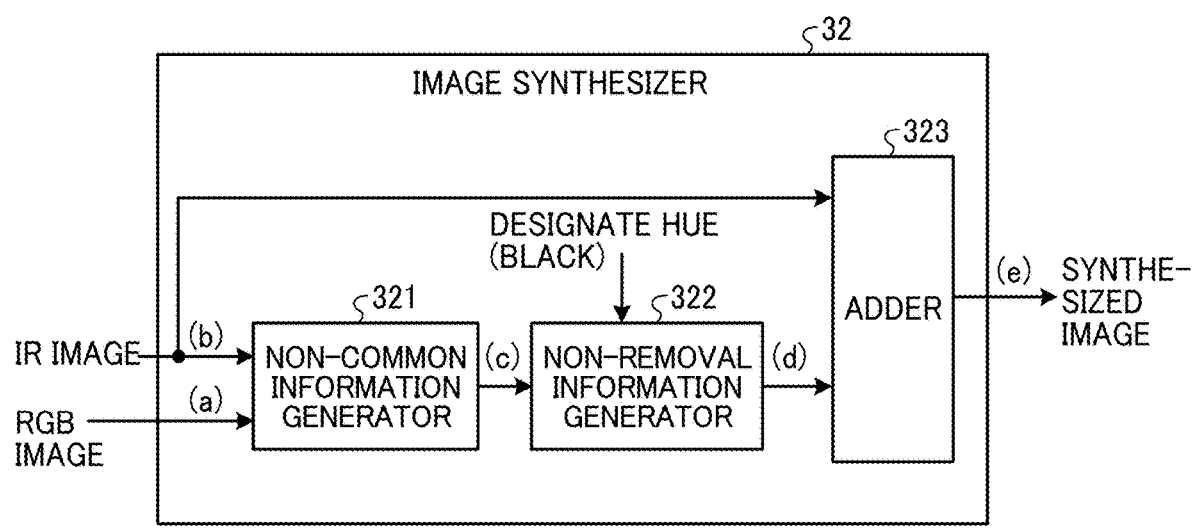
FIG. 24 is a block diagram illustrating a configuration of an image synthesizer included in the image reading device of FIG. 23.

FIG. 24 is a block diagram illustrating a configuration of the image synthesizer 32 included in the image reading device 101E described above.

As illustrated in FIG. 24, the image synthesizer 32 includes the non-common information generator 321, the non-removal information generator 322, and the adder 323.

Unlike the non-removal information generator 322 illustrated in FIG. 18, the non-removal information generator 322 illustrated in FIG. 24 designates black as hue. Although the hue is herein black, the hue is an achromatic color of intermediate to low densities.

In other words, the hue information is an achromatic color.

Figure 25A:
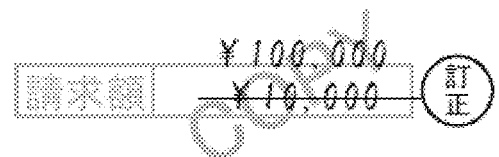
FIG. 25A is a diagram illustrating an image including information depicted with a carbonless black colorant.
Figure 25B:
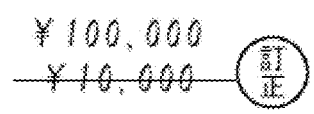
FIG. 25B is a diagram illustrating a result of reading of the image of FIG. 25A.

Referring now to FIGS. 25A and 25B, a description is given of an advantage of preventing the loss of content information depicted in carbonless black.

FIGS. 25A and 25B illustrate an example in which a horizontal correction line and a correction mark are depicted with a carbonless black colorant. Specifically, FIG. 25A is a diagram illustrating an image including information depicted with the carbonless black colorant. FIG. 25B is a diagram illustrating a result of reading of the image of FIG. 25A.

The content information to be left herein includes money information, the horizontal correction line, and the correction mark. When the image illustrated in FIG. 25A is read, the content information depicted in black remains alone as illustrated in FIG. 25B. That is, even in a case in which the information to be recognized is depicted with a carbonless black colorant, the present embodiment prevents erroneous recognition of the information and enhances the readability.

Figure 26:
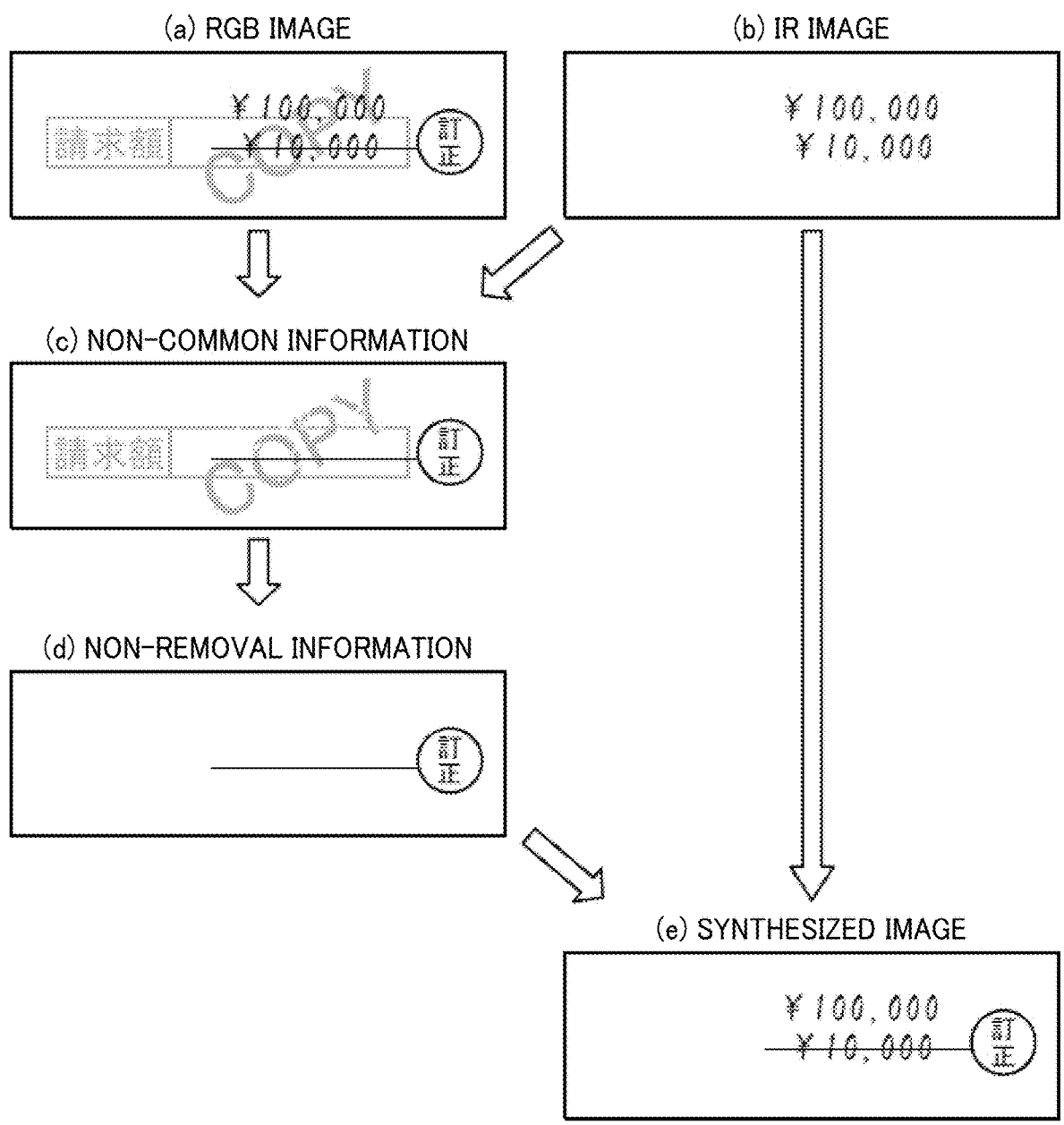
FIG. 26 is a diagram illustrating a process of generating a synthesized image without losing content information depicted in carbonless black.

Referring now to FIG. 26, a description is given of a process of generating a synthesized image without losing content information depicted in carbonless black.

FIG. 26 is a diagram illustrating the process of generating a synthesized image without losing content information depicted in carbonless black.

As illustrated in FIG. 26, the image synthesizer 32 (specifically, the non-removal information generator 322) selects, as non-removal information (d), part of the non-common information (c) according to the hue. The part of the non-removal information (c) is specifically the information of the horizontal correction line and the correction mark depicted with a carbonless black colorant. The non-removal information (d) is an image in which the correction line depicted on top of the other information simply remains together with the correction mark.

As described above, according to the present embodiment, the image reading device 101E reliably selects information not to be removed or information to be removed, with regard to the carbonless colorant.

Referring now to FIGS. 27 to 30, a description is given of an eighth embodiment of the present disclosure.

In the example described above with reference to FIG. 17, the content information is depicted in color. In some documents, content information is depicted in color while non-content information such as a ground pattern, a ruled line, or an imprint is depicted in black. Invisible (i.e., infrared) reading of such documents may lose all the content information.

To address such a situation, unlike the first to seventh embodiments, an image reading device 101F synthesizes images without losing content information in a case in which the content information and non-content information are depicted with a color colorant and a black colorant, respectively, in the eighth embodiment. Thus, the present embodiment prevents the loss of the content information. A redundant description of identical features in the first to eighth embodiments is herein omitted; whereas a description is now given of features of the eighth embodiment different from the features of the first to seventh embodiments.

Figure 27:
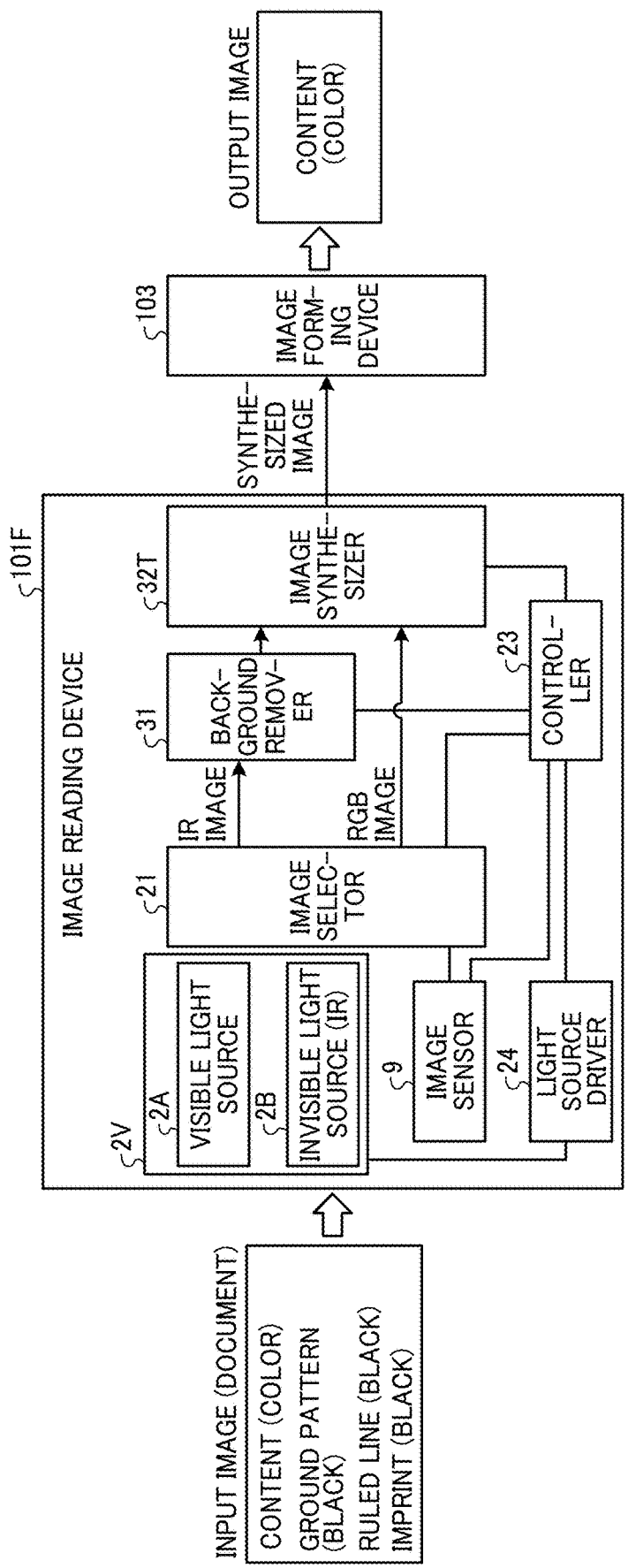
FIG. 27 is a block diagram illustrating electric connections of components of an image reading device according to an eighth embodiment of the present disclosure.

FIG. 27 is a block diagram illustrating electric connections of components of the image reading device 101F according to the eighth embodiment of the present disclosure.

As illustrated in FIG. 27, an input image to the image reading device 101F includes content information depicted with a color colorant and non-content information depicted with a black colorant. An image synthesizer 32T synthesizes an RGB image and an IR image to generate a synthesized image. The image synthesizer 32T thus outputs color content information alone.

Figure 28:
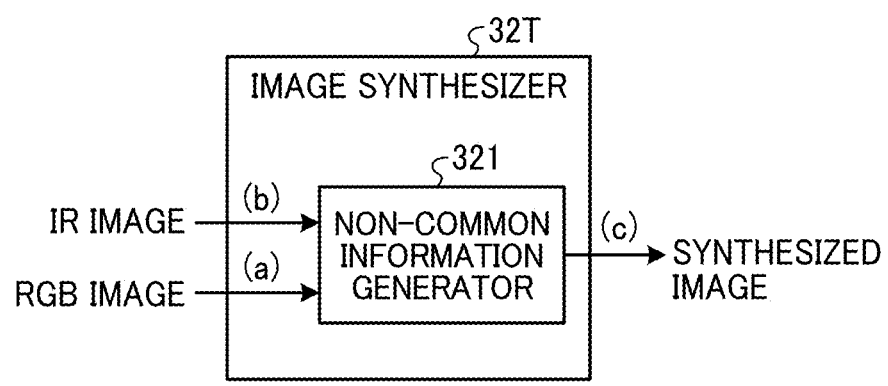
FIG. 28 is a block diagram illustrating a configuration of an image synthesizer included in the image reading device of FIG. 27.

FIG. 28 is a block diagram illustrating a configuration of the image synthesizer 32T included in the image reading device 101F described above.

As illustrated in FIG. 28, the image synthesizer 32T includes the non-common information generator 321.

The non-common information generator 321 detects non-common information of the RGB image and the IR image. The non-common information detected by the non-common information generator 321 corresponds to the color content information. The non-common information generator 321 outputs, as a synthesized image, the detected non-common information as is.

Note that, in FIG. 28, the non-common information generator 321 outputs all the non-common information as a synthesized image. Alternatively, the non-common information generator 321 may simply output part of the non-common information.

Referring now to FIGS. 29A and 29B, a description is given of an advantage attained in a case in which content information and non-content information are depicted with a color colorant and a black colorant, respectively.

FIGS. 29A and 29B illustrate an example in which an amount of money "¥10,000" is written in color as money information on a slip with text meaning "billing amount" and a ruled line depicted in black. Specifically, FIG. 29A is a diagram illustrating an image on the slip. FIG. 29B is a diagram illustrating a result of reading of the image of FIG. 29A.

The content information to be left herein includes money information. When the image illustrated in FIG. 29A is read, the content information depicted in color remains alone as illustrated in FIG. 29B. That is, the readability is enhanced even in a case in which the information to be recognized is depicted in color and the rest is depicted in black.

Figure 30:
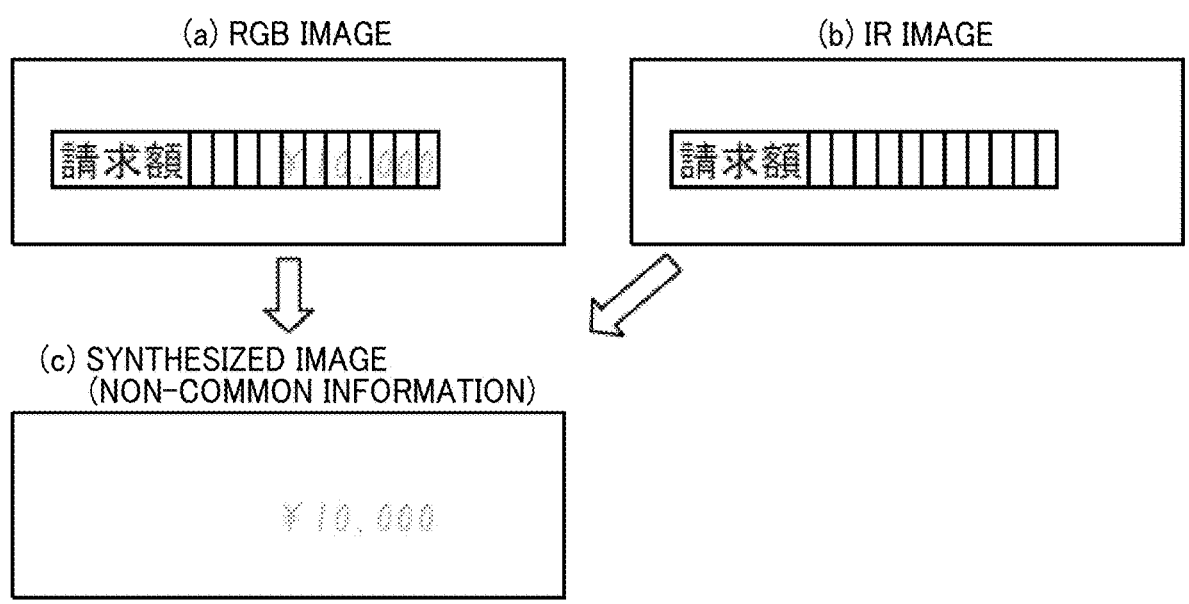
FIG. 30 is a diagram illustrating a process of generating a synthesized image in a case in which the content information and the non-content information depicted with the color colorant and the black colorant, respectively.

FIG. 30 is a diagram illustrating a process of generating a synthesized image in a case in which the content information and the non-content information are depicted with the color colorant and the black colorant, respectively.

As illustrated in FIG. 30, the image synthesizer 32T (specifically, the non-common information generator 321) generates non-common information (c) from an RGB image (a) and an IR image (b). As in the examples described above, the non-common information (c) is herein information that appears on the RGB image, not on the IR image. Specifically, the non-common information (c) is herein money information depicted in color. That is, the non-common information (c) is equivalent to the content information to be output. Accordingly, the image synthesizer 32T (specifically, the non-common information generator 321) outputs, as a synthesized image, the non-common information (c) as is.

As described above, the present embodiment enhances the readability even in a case in which the content information is depicted in color.

Referring now to FIGS. 31 to 34, a description is given of a ninth embodiment of the present disclosure.

In the examples described above, the ground pattern is non-content information, which is unnecessary for recognizing information. For example, a ground pattern "COPY" originally has a meaning to clearly indicate that the document is a copied document. In a case in which a secondary user receives the document as output information, the secondary user might misunderstand the document as a counterfeit. This is because receivers habitually determine the authenticity or confirm that the document is genuine, based on the presence or absence of the ground pattern. In actual, since the ground pattern varies depending on the shade of printing, the presence or absence of the ground pattern does not lead to a reliable determination.

To address such a situation, unlike the first to eighth embodiments, an image reading device 101G adds management information indicating a removal of a ground pattern to content information to be output in the ninth embodiment. Thus, the present embodiment prevents a receiver from misunderstanding a document as a counterfeit. A redundant description of identical features in the first to ninth embodiments is herein omitted; whereas a description is now given of features of the ninth embodiment different from the features of the first to eighth embodiments.

Figure 31:
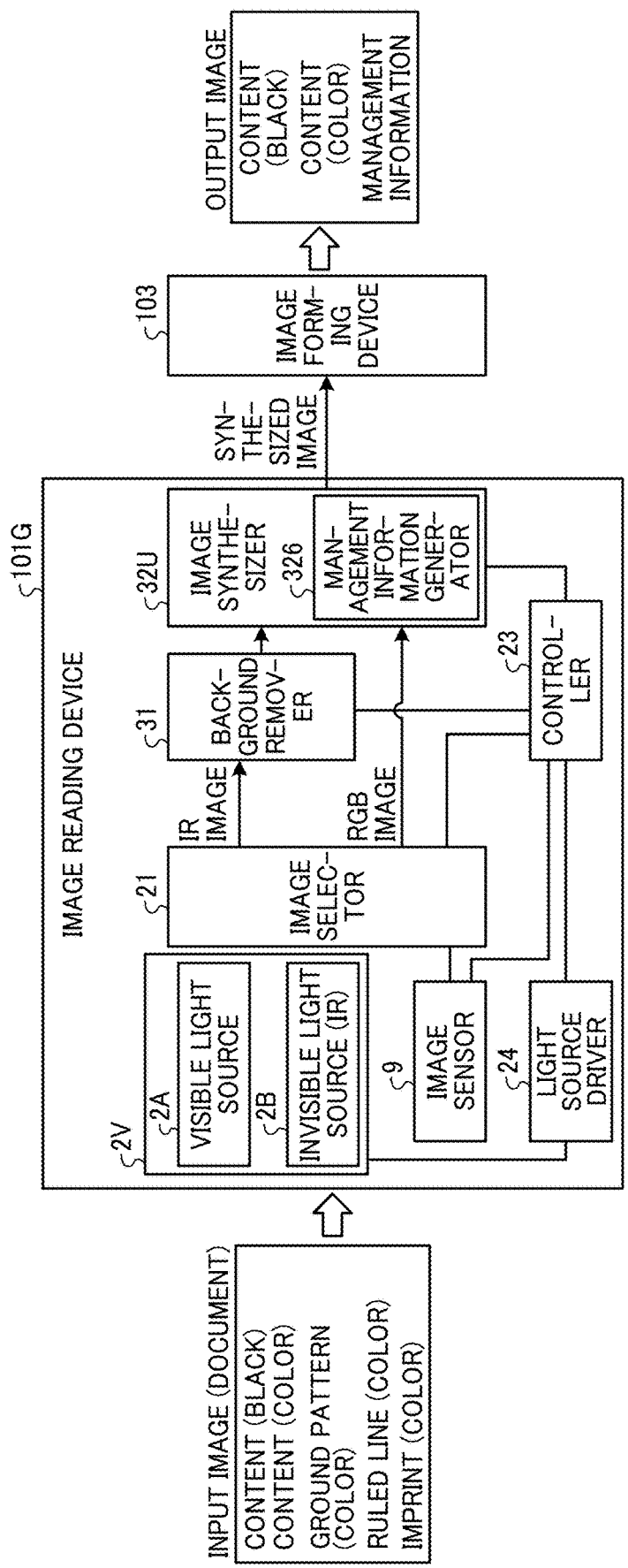
FIG. 31 is a block diagram illustrating electric connections of components of an image reading device according to a ninth embodiment of the present disclosure.

FIG. 31 is a block diagram illustrating electric connections of components of the image reading device 101G according to the ninth embodiment of the present disclosure.

As illustrated in FIG. 31, an image synthesizer 32U of the image reading device 101G includes management information generator 326. The management information generator 326 generates management information, which is added to content information to be output.

Figure 32:
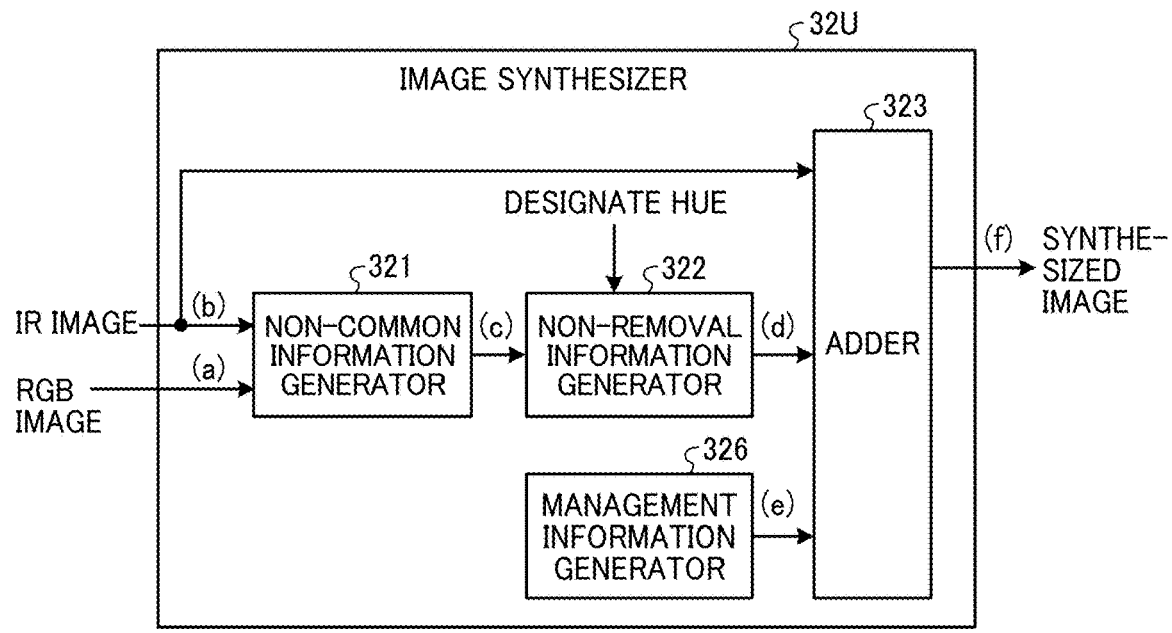
FIG. 32 is a block diagram illustrating a configuration of an image synthesizer included in the image reading device of FIG. 31.

FIG. 32 is a block diagram illustrating a configuration of the image synthesizer 32U included in the image reading device 101G described above.

As illustrated in FIG. 32, the image synthesizer 32U includes the non-common information generator 321, the non-removal information generator 322, the adder 323, and the management information generator 326.

The management information generator 326 generates management information, which is added to content information to be output. The adder 323 synthesizes images while including the management information generated by the management information generator 326.

In other words, the image synthesizer 32U serving as an image synthesizing unit adds, to a synthesized image, information indicating that the image selector 21 serving as an image selecting unit has selected the first information.

Specifically, in FIG. 32, the adder 323 adds non-removal information and the management information to an IR image. In a case in which the adder 323 is not provided as illustrated in FIG. 21, the adder 323 may be separately provided to add the management information.

Figure 33A:
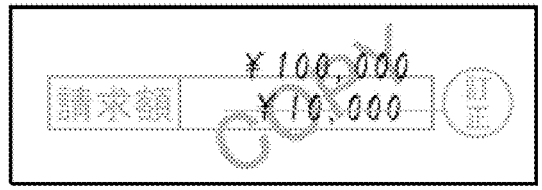
FIG. 33A is a diagram illustrating an image on a slip.
Figure 33B:
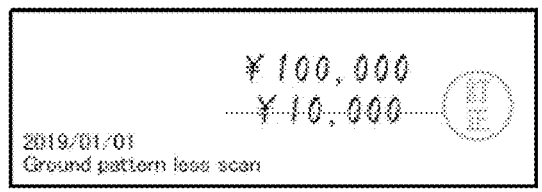
FIG. 33B is a diagram illustrating a result of reading of the image of FIG. 33A with management information.
Figure 33C:
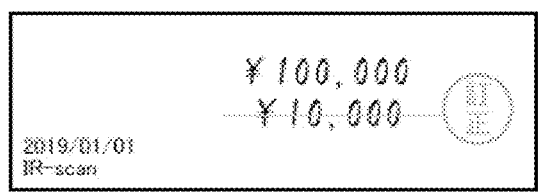
FIG. 33C is a diagram illustrating another result of reading of the image of FIG. 33A with management information.

Referring now to FIGS. 33A to 33C, a description is given of an advantage of adding management information to content information to be output.

FIGS. 33A to 33C illustrate an example in which an amount of money "¥10,000" is written in black as money information on a slip with a ground pattern "COPY" depicted in color. The amount of money "¥10,000" is corrected with a color horizontal line to another amount of money "¥100,000" that is written in black as another piece of money information. Specifically, FIG. 33A is a diagram illustrating an image on the slip. FIG. 33B is a diagram illustrating a result of reading of the image of FIG. 33A with management information. FIG. 33C is a diagram illustrating another result of reading of the image of FIG. 33A with management information.

The content information to be left herein includes money information, the horizontal correction line, and the correction mark. When the image illustrated in FIG. 33A is read, the content information and the management information remain as illustrated in FIG. 33B. In the example illustrated in FIG. 33B, the management information includes information indicating the date on which the content information is selectively read and a function "Ground pattern less scan." In another example illustrated in FIG. 33C, the management information includes information indicating the date on which the content information is selectively read and a function "IR scan."

Referring now to FIG. 34, a description is given of a process of generating a synthesized image by adding management information to content information to be output.

FIG. 34 is a diagram illustrating the process of generating a synthesized image by adding management information to content information to be output.

As illustrated in FIG. 34, the image synthesizer 32U (specifically, the management information generator 326)

generates management information (e). The image synthesizer 32U (specifically, the adder 323) then generates a synthesized image (0 including the management information (e).

As described above, according to the present embodiment, a receiver easily understands that the information of an original is read because the management information indicating the information is selectively output is added to the content information. Thus, the present embodiment prevents the receiver from misunderstanding the document (i.e., content information) as counterfeit.

Note that the management information may include output date and time, a user or sender name outputting the information, and an identification number of a device used for the output, provided that the receiver understands that the original is read.

Note that in the embodiments described above, the image forming apparatus 100 is described as an MFP having at least two of copying, printing, scanning, and facsimile functions. Alternatively, the image forming apparatus 100 may be, e.g., a copier, a printer, a scanner, or a facsimile machine. In the embodiments described above, an output device is combined with the image reading with invisible light, thus facilitating confirmation of the whole document at hand and at once. In addition, an output material is advantageously usable as an evidence.

According to the embodiments described above, the readability of a document or code with, e.g., a ground pattern is enhanced.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:
1. An image processing device comprising:
a light source configured to irradiate an object at least with invisible light;
an image reader configured to read:
first information included in the object and indicating a first reflection characteristic in response to the object being irradiated with the invisible light; and
second information included in the object and indicating a second reflection characteristic which is higher in reflectivity than the first reflection characteristic in response to the object being irradiated with the invisible light; and
circuitry configured to selectively output the first information read by the image reader.
2. The image processing device according to claim 1, wherein the light source is configured to emit infrared light having a wavelength of from 780 nm to 1000 nm as the invisible light.
3. The image processing device according to claim 1, wherein the first characteristic is a characteristic of absorbing the invisible light, and wherein the second characteristic is a characteristic of transmitting the invisible light.
4. The image processing device according to claim 3, wherein the first characteristic and the second characteristic are different from each other depending on whether or not the first information and the second information include carbon black.
5. The image processing device according to claim 1, wherein the first information includes at least one of text information and code information.
6. The image processing device according to claim 1, wherein the second information includes at least one of a ground pattern, an imprint, and a ruled line.
7. The image processing device according to claim 1, wherein the circuitry is configured to remove a background other than the first information.
8. The image processing device according to claim 7, wherein the circuitry is configured to remove the background by binarization.
9. The image processing device according to claim 1, wherein the light source is configured to irradiate the object with visible light,
wherein the image reader is configured to read third information included in the object and obtainable in response to the object being irradiated with the visible light, and
wherein the circuitry is configured to output the third information read by the image reader.
10. The image processing device according to claim 9, wherein the image reader is configured to read the third information and one of the first information and the second information at once.
11. The image processing device according to claim 9, wherein the circuitry is configured to synthesize the first information and the third information to generate a synthesized image, and wherein the circuitry is configured not to remove part of non-common information of the first information and the third information.

12. The image processing device according to claim 11, wherein the circuitry is configured to:
detect the non-common information of the first information and the third information;
select non-removal information not to be removed from the non-common information; and
add the non-removal information to the first information.

13. The image processing device according to claim 12, wherein the circuitry is configured to select the non-removal information according to hue information.

14. The image processing device according to claim 13, wherein the hue information is an achromatic color.

15. The image processing device according to claim 11, wherein the circuitry is configured to:
detect the non-common information of the first information and the third information;
select removal information to be removed from the non-common information; and
remove the removal information from the third information.

16. The image processing device according to claim 15, wherein the circuitry is configured to select the removal information according to hue information.

17. The image processing device according to claim 11, wherein the circuitry is configured to add, to the synthesized image, information indicating that the circuitry has selected the first information.

18. The image processing device according to claim 9, wherein the circuitry is configured to synthesize the first information and the third information to generate a synthesized image, and
wherein the circuitry is configured to synthesize at least part of non-common information of the first information and the third information.

19. An image forming apparatus comprising:
the image processing device according to claim 1; and
an image forming device configured to form an image in accordance with information from the image processing device.

20. An image processing method comprising:
reading:
first information included in an object and indicating a first reflection characteristic in response to the object being irradiated with invisible light; and
second information included in the object and indicating a second reflection characteristic which is higher in reflectivity than the first reflection characteristic in response to the object being irradiated with the invisible light; and
selectively outputting the first information read.

* * * * *